US012613929B2

(12) United States Patent
Zuo et al.

(10) Patent No.: US 12,613,929 B2
(45) Date of Patent: Apr. 28, 2026

(54) MULTI-STAGE TRAINING OF A TAGGING MODEL WITH QUERY SUPPLEMENTATION AND ADVERSARIAL ENHANCEMENT

(71) Applicant: Microsoft Technology Licensing, LLC, Redmond, WA (US)

(72) Inventors: Simiao Zuo, Redmond, WA (US); Pengfei Tang, Redmond, WA (US); Xinyu Hu, Mountain View, CA (US); Qiang Lou, Sammamish, WA (US); Jian Jiao, Bellevue, WA (US); Denis Xavier Charles, Redmond, WA (US); Eren Manavoglu, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 18/593,870

(22) Filed: Mar. 2, 2024

(65) Prior Publication Data

US 2025/0278442 A1      Sep. 4, 2025

(51) Int. Cl.
    *G06F 16/9532*          (2019.01)
    *G06F 40/284*           (2020.01)
(52) U.S. Cl.
    CPC ........ *G06F 16/9532* (2019.01); *G06F 40/284* (2020.01)
(58) Field of Classification Search
    CPC ............................ G06F 16/9532; G06F 40/284
    See application file for complete search history.

(56) References Cited

U.S. PATENT DOCUMENTS

2021/0334659 A1*  10/2021  Ding ........................ G06N 3/04
2025/0272304 A1*   8/2025  Ma ......................... G06F 16/248

OTHER PUBLICATIONS

Yoo et al., "GPT3Mix: Leveraging Large-scale Language Models for Text Augmentation", Nov. 11, 2021 (Year: 2021).*
Wei et al., "Chain-of-Thought Prompting Elicits Reasoning in Large Language Models", Jan. 10, 2023 (Year: 2023).*
Jiang et al., "Named Entity Recognition with Small Strongly Labeled and Large Weakly Labeled Data", Aug. 1, 2021 (Year: 2021).*

(Continued)

*Primary Examiner* — Richemond Dorvil
*Assistant Examiner* — Adam Michael Weaver

(57)                    ABSTRACT

A technique is described herein for training a tagging model that is able to successfully interpret queries. The technique trains the tagging model in plural stages. A first stage continues training a pre-trained language model based on a set of queries, to produce a first-stage model. A second stage performs training on the basis of a set of supplemented queries and associated weak labels, to produce a second-stage model. Each supplemented query combines a query with titles of documents that match the query. A third stage performs training on the basis of a set of supplemented queries and associated strong labels, to produce a third-stage model. The third stage also uses adversarial knowledge enhancement that has the effect of making the data presented to the third-stage model more difficult for the third-stage model to interpret. This, in turn, improves the generalization capabilities and robustness of the third-stage model.

20 Claims, 10 Drawing Sheets

(56)　　　　　References Cited

OTHER PUBLICATIONS

Liu et al., "Adversarial Training for Large Neural Language Models", Apr. 29, 2020 (Year: 2020).*
Rosenberg, et al., "Semi-Supervised Self-Training of Object Detection Models," in 2005 Seventh IEEE Workshops on Applications of Computer Vision (WACV/MOTION'05), vol. 1, 2005, 8 pages.
Sahu, et al., "Data Augmentation for Intent Classification with Off-the-shelf Large Language Models," in Proceedings of the 4th Workshop on NLP for Conversational AI, May 2022, pp. 47-57.
Shafahi, et al., "Adversarial Training for Free!," in 33rd Conference on Neural Information Processing Systems (NeurIPS 2019), 2019, 12 pages.
Szegedy, et al., "Intriguing properties of neural networks," arXiv, arXiv:1312.6199v4 [cs.CV], Feb. 19, 2014, 10 pages.
Tjong, et al., "Introduction to the CoNLL-2002 Shared Task: Language-Independent Named Entity Recognition," in COLING-02: The 6th Conference on Natural Language Learning 2002 (CoNLL-2002), 2002, 4 pages.
Varma, et al., "Snuba: Automating Weak Supervision to Label Training Data," in Proceedings of the VLDB Endowment, International Conference on Very Large Data Bases, vol. 12, 2018, 43 pages.
Wang, et al., "Is ChatGPT a Good NLG Evaluator? A Preliminary Study," arXiv, arXiv:2303.04048v3 [cs.CL], Oct. 24, 2023, 11 pages.
Wei, et al., 2022. "Chain-of-Thought Prompting Elicits Reasoning in Large Language Models," in arXiv, arXiv:2201.11903v6 [cs.CL], Jan. 10, 2023, 43 pages.
Wen, et al., "Building Large-Scale Deep Learning System for Entity Recognition in E-Commerce Search," in Proceedings of the 6th IEEE/ACM International Conference on Big Data Computing, Applications and Technologies, Dec. 2019, pp. 149-154.
Wolf, et al., "Transformers: State-of-the-Art Natural Language Processing," in Proceedings of the 2020 EMNLP (Systems Demonstrations), 2020, pp. 38-45.
Wu, et al., "Large Language Models are Diverse Role-Players for Summarization Evaluation," in arXiv, arXiv:2303.15078v3 [cs.CL], Sep. 19, 2023, 12 pages.
Xie, et al., "Unsupervised Deep Embedding for Clustering Analysis," in Proceedings of the 33rd International Conference on Machine Learning, PMLR 48:478-487, 2016, 10 pages.
Xie, et al., "Unsupervised Data Augmentation for Consistency Training," in Advances in Neural Information Processing Systems 33: Annual Conference on Neural Information Processing Systems 2020, NeurIPS 2020, Dec. 2020, 13 pages.
Xie, et al., "An Explanation of In-context Learning as Implicit Bayesian Inference," available at https://openreview.net/forum?id=RdJVFCHjUMI, in Tenth International Conference on Learning Representations, ICLR 2022, Virtual Event, Apr. 2022, last modified Oct. 2023, 25 pages.
Yoo, et al., "GPT3Mix: Leveraging Large-scale Language Models for Text Augmentation," in Findings of the Association for Computational Linguistics: EMNLP 2021, Nov. 2021, pp. 2225-2239.
Yu, et al., "Fine-Tuning Pre-trained Language Model with Weak Supervision: A Contrastive-Regularized Self-Training Approach," in Proceedings of the 2021 Conference of the North American Chapter of the Association for Computational Linguistics: Human Language Technologies, Jun. 2021, pp. 1063-1077.
Zhang, et al., "QUEACO: Borrowing Treasures from Weakly-labeled Behavior Data for Query Attribute Value Extraction," in Proceedings of the 30th ACM International Conference on Information & Knowledge Management, Nov. 2021, pp. 4362-4372.
Zhu, et al., "FreeLB: Enhanced Adversarial Training for Natural Language Understanding," available at https://openreview.net/forum?id=BygzbyHFvB, in 8th International Conference on Learning Representations, ICLR 2020, Apr. 2020, last modified May 2023, 14 pages.

Zuo, et al., "ARCH: Efficient Adversarial Regularized Training with Caching," in Findings of the Association for Computational Linguistics: EMNLP 2021. Association for Computational Linguistics, Oct. 2021, pp. 4118-4131.
Zuo, et al.,"Adversarial Regularization as Stackelberg Game: An Unrolled Optimization Approach," in Proceedings of the 2021 Conference on Empirical Methods in Natural Language Processing, Nov. 2021, pp. 6562-6577.
Zuo, et al., "Self-Training with Differentiable Teacher," in Findings of the Association for Computational Linguistics: NAACL 2022, Jul. 2022, pp. 933-949.
Zuo, et al., "DeepTagger: Knowledge Enhanced Named Entity Recognition for Web-Based Ads Queries," in CIKM '23: Proceedings of the 32nd ACM International Conference on Information and Knowledge Management, Oct. 2023, pp. 5002-5009.
Zuo, et al., "DeepTagger: Knowledge Enhanced Named Entity Recognition for Web-Based Ads Queries," arXiv, arXiv:2306.17413v1 [cs.IR], Jun. 30, 2023, 20 pages.
Jiang, et al., "SMART: Robust and Efficient Fine-Tuning for Pre-trained Natural Language Models through Principled Regularized Optimization," in Proceedings of the 58th Annual Meeting of the Association for Computational Linguistics, Jul. 2020, pp. 2177-2190.
Vaswani, et al., "Attention Is All You Need," in 31st Conference on Neural Information Processing Systems (NIPS 2017), 2017, 11 pages.
Aghajanyan, et al., "Better Fine-Tuning by Reducing Representational Collapse," arXiv, arXiv:2008.03156v1 [cs.LG] Aug. 6, 2020, 12 pages.
Awasthi, et al., "Learning from Rules Generalizing Labeled Exemplars," available at https://openreview.net/forum?id=SkeuexBtDr, in 8th International Conference on Learning Representations, Dec. 2019, 2020, 17 pages.
Cheng, et al., "Posterior Differential Regularization with f-divergence for Improving Model Robustness," in Proceedings of the 2021 Conference of the North American Chapter of the Association for Computational Linguistics: Human Language Technologies, Jun. 2021, pp. 1078-1089.
Cheng, et al., "An End-to-End Solution for Named Entity Recognition in eCommerce Search," in Thirty-Fifth AAAI Conference on Artificial Intelligence, AAAI 2021, Feb. 2021. pp. 15098-15106.
Chiang, et al., "Can Large Language Models Be an Alternative to Human Evaluations?," ArXiv, arXiv:2305.01937v1 [cs.CL], May 3, 2023, 23 pages.
Devlin, et al., "BERT: Pre-training of Deep Bidirectional Transformers for Language Understanding," in Proceedings of the 2019 Conference of the North American Chapter of the Association for Computational Linguistics: Human Language Technologies, vol. 1 (Long and Short Papers), Jun. 2018, pp. 4171-4186.
Ding, et al., "Is GPT-3 a Good Data Annotator?," arXiv, arXiv:2212.10450v2 [cs.CL], Jun. 14, 2023, 21 pages.
Dodge, et al., "Fine-Tuning Pretrained Language Models: Weight Initializations, Data Orders, and Early Stopping," arXiv, arXiv:2002.06305v1 [cs.CL], Feb. 15, 2020, 11 pages.
Goodfellow, et al.,"Explaining and Harnessing Adversarial Examples," arXiv, arXiv:1412.6572v3 [stat.ML], Mar. 20, 2015, 11 pages.
Gururangan, et al., "Don't Stop Pretraining: Adapt Language Models to Domains and Tasks." in Proceedings of the 58th Annual Meeting of the Association for Computational Linguistics. Association for Computational Linguistics, Jul. 2020, pp. 8342-8360.
Jiang, et al., "Named Entity Recognition with Small Strongly Labeled and Large Weakly Labeled Data," in Proceedings of the 59th Annual Meeting of the Association for Computational Linguistics and the 11th International Joint Conference on Natural Language Processing, Aug. 2021, pp. 1775-1789.
Lee, Dong-Hyun, "Pseudo-Label : The Simple and Efficient Semi-Supervised Learning Method for Deep Neural Networks," in Workshop on Challenges in Representation Learning, ICML, vol. 3. 896, 2013, 6 pages.
Liang, et al., "BOND: BERT-Assisted Open-Domain Named Entity Recognition with Distant Supervision," in KDD '20: The 26th ACM SIGKDD Conference on Knowledge Discovery and Data Mining, Virtual Event, Aug. 2020, pp. 1054-1064.

(56)  References Cited

OTHER PUBLICATIONS

Liang, et al., "R-Drop: Regularized Dropout for Neural Networks," in Advances in Neural Information Processing Systems 34: Annual Conference on Neural Information Processing Systems 2021, NeurIPS 2021, Dec. 2021, 16 pages.

Lison, et al., "Named Entity Recognition without Labelled Data: A Weak Supervision Approach," in Proceedings of the 58th Annual Meeting of the Association for Computational Linguistics. Association for Computational Linguistics, Jul. 2020, pp. 1518-1533.

Liu, et al., "Pre-train, Prompt, and Predict: A Systematic Survey of Prompting Methods in Natural Language Processing," in ACM Computing Surveys, vol. 55, Issue 9, Article No. 195, Jan. 2023, pp. 1-35.

Liu, et al., "A First Look at LLM-Powered Generative News Recommendation," arXiv, arXiv:2305.06566v4 [cs.IR], Aug. 31, 2023, 14 pages.

Liu, et al., "Adversarial Training for Large Neural Language Models," arXiv, arXiv:2004.08994v2 [cs.CL], Apr. 29, 2020, 13 pages.

Madry, et al., "Towards Deep Learning Models Resistant to Adversarial Attacks," available at https://openreview.net/forum?id=rJzIBfZAb, in 6th International Conference on Learning Representations, ICLR 2018, Conference Track Proceedings, modified Oct. 2023, 23 pages.

Meng, et al., "Text Classification Using Label Names Only: A Language Model Self-Training Approach," in Proceedings of the 2020 Conference on Empirical Methods in Natural Language Processing (EMNLP), Nov. 2020, pp. 9006-9017.

Miyato, et al., "Adversarial Training Methods for Semi-Supervised Text Classification," in 5th International Conference on Learning Representations, ICLR 2017, 2017, Conference Track Proceedings, last modified Oct. 2023, 11 pages.

Miyato, et al., "Virtual Adversarial Training: A Regularization Method for Supervised and Semi-Supervised Learning," in arXiv, inarXiv:1704.03976v2 [stat.ML], Jun. 27, 2018, 16 pages.

Mukherjee, et al., "Uncertainty-aware Self-training for Text Classification with Few Labels," arXiv, arXiv:2006.15315v1 [cs.CL], Jun. 27, 2020, 14 pages.

Nishikawa, et al., "EASE: Entity-Aware Contrastive Learning of Sentence Embedding," in Proceedings of the 2022 Conference of the North American Chapter of the Association for Computational Linguistics: Human Language Technologies, Jul. 2022, pp. 3870-3885.

Achiam, et al., (OpenAI), "GPT-4 Technical Report," arXiv, arXiv:2303.08774v4 [cs.CL], Dec. 19, 2023, 100 pages.

Paszke, et al., "PyTorch: An Imperative Style, High-Performance Deep Learning Library," in Advances in Neural Information Processing Systems 32: Annual Conference on Neural Information Processing Systems 2019, NeurIPS 2019, Dec. 2019, 12 pages.

Pereyra, et al., "Regularizing Neural Networks by Penalizing Confident Output Distributions," arXiv, arXiv:1701.06548v1 [cs.NE], Jun. 23, 2017, 12 pages.

Raghunathan, et al., "Understanding and Mitigating the Tradeoff between Robustness and Accuracy," in Proceedings of the 37th International Conference on Machine Learning, PMLR 119:7909-7919, 2020, 11 pages.

Ratner, et al., "Snorkel: Rapid Training Data Creation with Weak Supervision," in Proceedings of the VLDB Endowment, vol. 11, Issue 3, Nov. 2017, pp. 269-282.

Reimers, et al., "Sentence-BERT: Sentence Embeddings using Siamese BERT-Networks," in Proceedings of the 2019 Conference on Empirical Methods in Natural Language Processing and the 9th International Joint Conference on Natural Language Processing, Nov. 2019, pp. 3982-3992.

* cited by examiner

Figure 1:
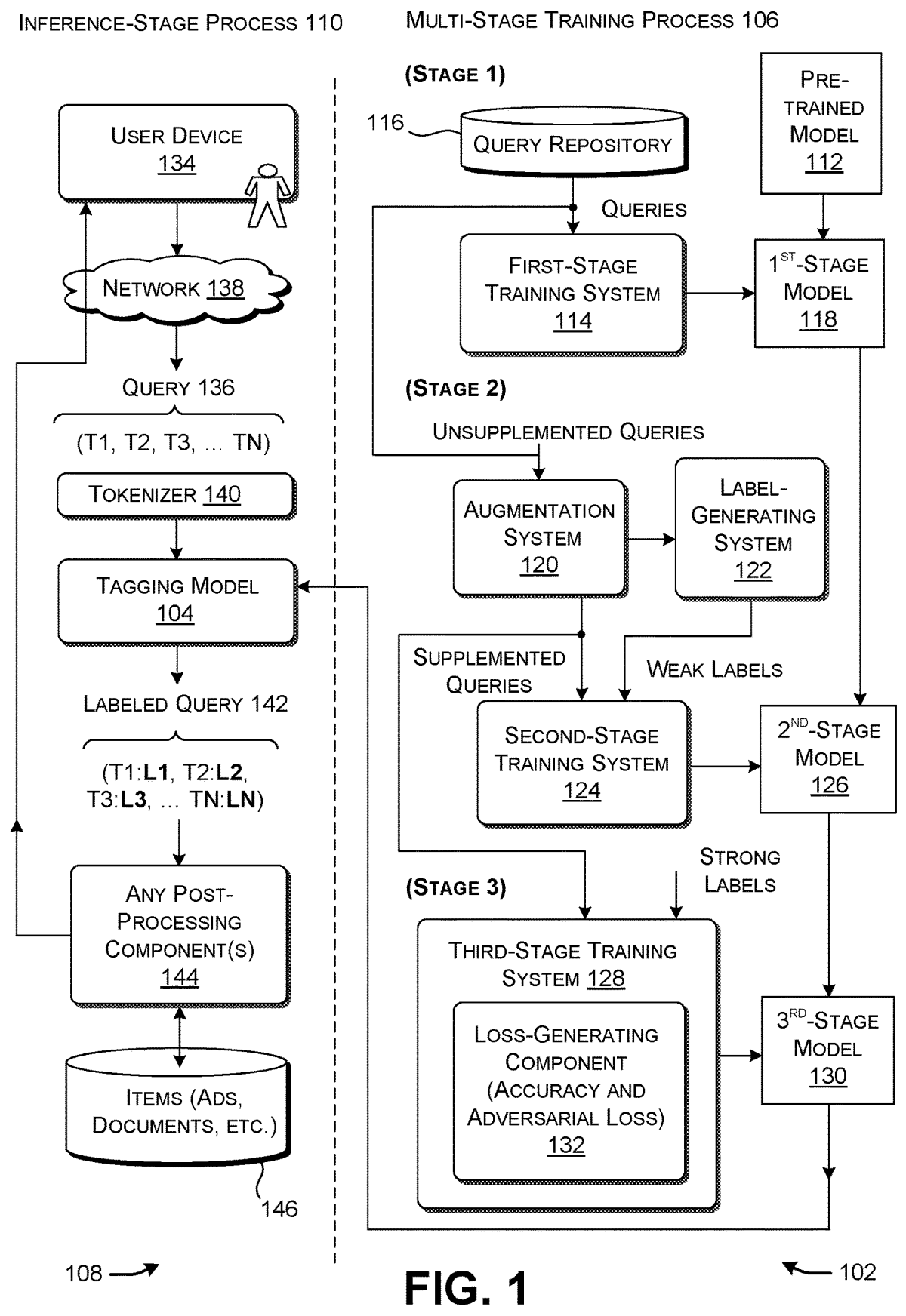

INFERENCE-STAGE PROCESS 110

MULTI-STAGE TRAINING PROCESS 106

(STAGE 1)

USER DEVICE
134

NETWORK 138

QUERY 136

(T1, T2, T3, ... TN)

TOKENIZER 140

TAGGING MODEL
104

LABELED QUERY 142

(T1:L1, T2:L2,
T3:L3, ... TN:LN)

ANY POST-
PROCESSING
COMPONENT(S)
144

ITEMS (ADS,
DOCUMENTS, ETC.)

146

116    QUERY REPOSITORY

QUERIES

FIRST-STAGE
TRAINING SYSTEM
114

PRE-
TRAINED
MODEL
112

1$^{ST}$-STAGE
MODEL
118

(STAGE 2)

UNSUPPLEMENTED QUERIES

AUGMENTATION
SYSTEM
120

LABEL-
GENERATING
SYSTEM
122

SUPPLEMENTED
QUERIES

WEAK LABELS

SECOND-STAGE
TRAINING SYSTEM
124

2$^{ND}$-STAGE
MODEL
126

STRONG
LABELS

(STAGE 3)

THIRD-STAGE TRAINING
SYSTEM 128

LOSS-GENERATING
COMPONENT
(ACCURACY AND
ADVERSARIAL LOSS)
132

3$^{RD}$-STAGE
MODEL
130

FIRST-STAGE
TRAINING SYSTEM

114

INPUT QUERY

TOKENIZER 202

MASK

204 { CLS | TERM1 | T~~ERM2~~ | • • • | TERMN | SEP

FIRST-
STAGE
MODEL 118

206 { $P_{T1}$ | $P_{MASK}$ | • • • | $P_{TN}$

LOSS-GENERATING COMPONENT 208

PARAMETER UPDATING COMPONENT 210

User search queries may contain various entity types such as Band, Product, Product Models, Services, Specification Attribute, Location, Media or Person.  Assign labels to each entity as follows:

For a given input search query, label each word with its entity type.  If a word is an entity but doesn't match any provided labels, label it as Other_Entity.  If uncertain about the entity type, label it as Uncertain_Entity.  For multi-word entitites, label each word in the span with the same entity, e.g., Mountain View should be Mountain: Location, View: Location.  Ensure each word has a correcting tag in the output .

Refer to the examples below for guidance:

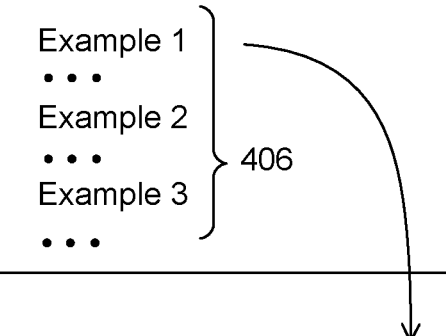

Example 1

• • •

Example 2

• • •        } 406

Example 3

• • •

FIRST PART 404

Input Query:
buy apple iphone 13 128gb black paris

CHAIN-OF-THOUGHT EXAMPLE 408

Web Title 1:
Apple iPhone 13 12BGB Black – Apple Store Paris
Web Title 1:

Chain-of-Thoughts:
The web search titles confirm that Apple is a a brand, iPhone 13 is a product, and 128FB black is a specification attribute.  The titles also metnion that it is possible to buy the product in Paris, which is a location.  No new information is provided in the titles.

DESCRIPTION OF SUPPLEMENTED QUERY BEING SUBMITTED

SECOND PART 410

ORIGINAL QUERY

THIRD-STAGE SYSTEM 502 →

AUGMENTATION SYSTEM 120

INPUT QUERY, TARGET ITEM TITLES

THIRD-STAGE TRAINING SYSTEM 128

TOKENIZER 504

TITLE1     TITLE2

506 { CLS | TERM1 | • • • | TERMN | SEP | TL1 | SEP | TL2 | SEP | • • •

THIRD-STAGE MODEL 130

$L_{T1}$ • • • $L_{TN}$ } 508

STRONG LABELS

LOSS-GENERATING COMPONENT 132

MAIN LOSS-GENERATING COMPONENT 510

ADVERSARIAL LOSS-GENERATING COMPONENT 512

PARAMETER UPDATING COMPONENT 514

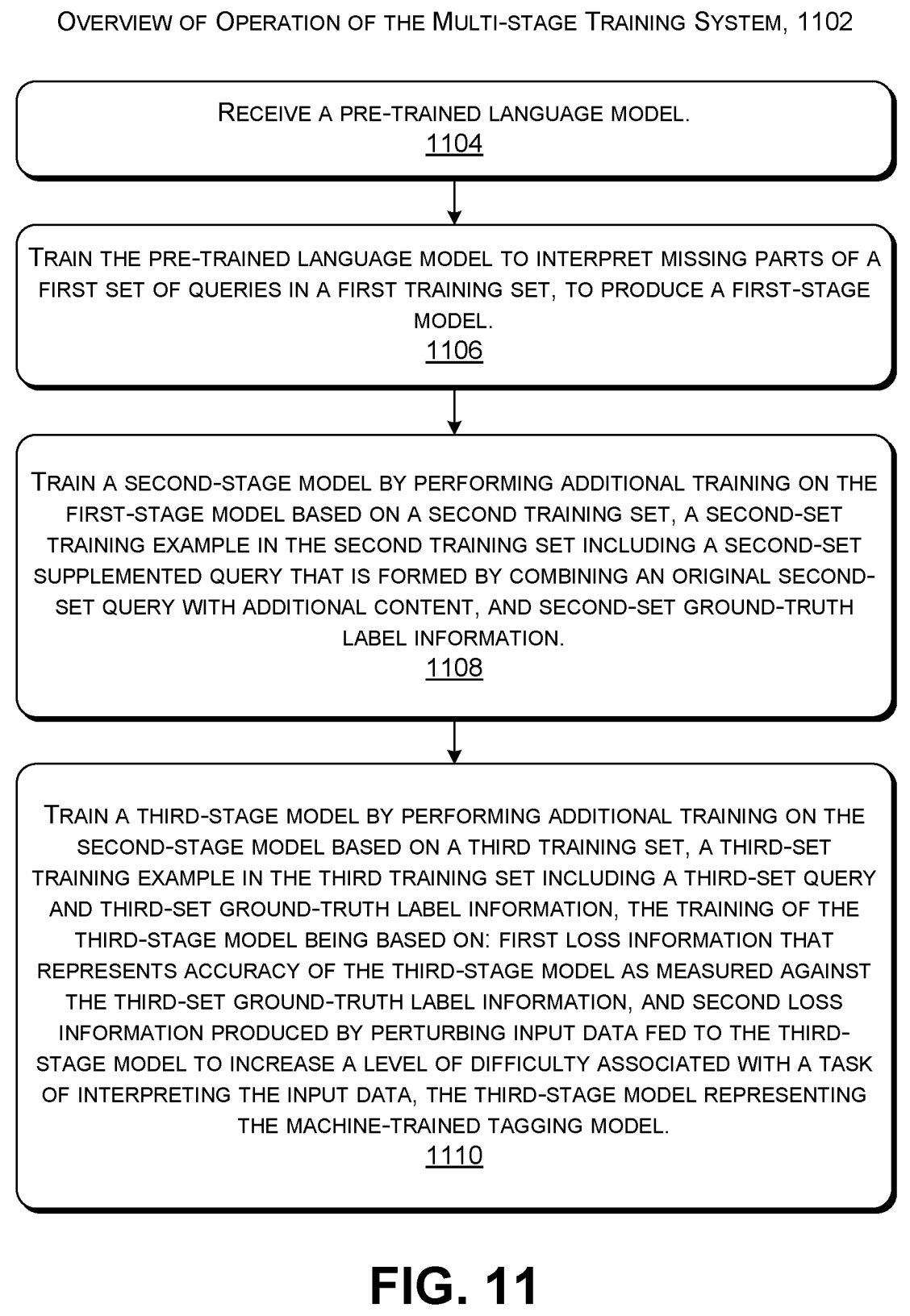

OVERVIEW OF OPERATION OF THE MULTI-STAGE TRAINING SYSTEM, 1102

RECEIVE A PRE-TRAINED LANGUAGE MODEL.
1104

TRAIN THE PRE-TRAINED LANGUAGE MODEL TO INTERPRET MISSING PARTS OF A FIRST SET OF QUERIES IN A FIRST TRAINING SET, TO PRODUCE A FIRST-STAGE MODEL.
1106

TRAIN A SECOND-STAGE MODEL BY PERFORMING ADDITIONAL TRAINING ON THE FIRST-STAGE MODEL BASED ON A SECOND TRAINING SET, A SECOND-SET TRAINING EXAMPLE IN THE SECOND TRAINING SET INCLUDING A SECOND-SET SUPPLEMENTED QUERY THAT IS FORMED BY COMBINING AN ORIGINAL SECOND-SET QUERY WITH ADDITIONAL CONTENT, AND SECOND-SET GROUND-TRUTH LABEL INFORMATION.
1108

TRAIN A THIRD-STAGE MODEL BY PERFORMING ADDITIONAL TRAINING ON THE SECOND-STAGE MODEL BASED ON A THIRD TRAINING SET, A THIRD-SET TRAINING EXAMPLE IN THE THIRD TRAINING SET INCLUDING A THIRD-SET QUERY AND THIRD-SET GROUND-TRUTH LABEL INFORMATION, THE TRAINING OF THE THIRD-STAGE MODEL BEING BASED ON: FIRST LOSS INFORMATION THAT REPRESENTS ACCURACY OF THE THIRD-STAGE MODEL AS MEASURED AGAINST THE THIRD-SET GROUND-TRUTH LABEL INFORMATION, AND SECOND LOSS INFORMATION PRODUCED BY PERTURBING INPUT DATA FED TO THE THIRD-STAGE MODEL TO INCREASE A LEVEL OF DIFFICULTY ASSOCIATED WITH A TASK OF INTERPRETING THE INPUT DATA, THE THIRD-STAGE MODEL REPRESENTING THE MACHINE-TRAINED TAGGING MODEL.
1110

FIG. 11

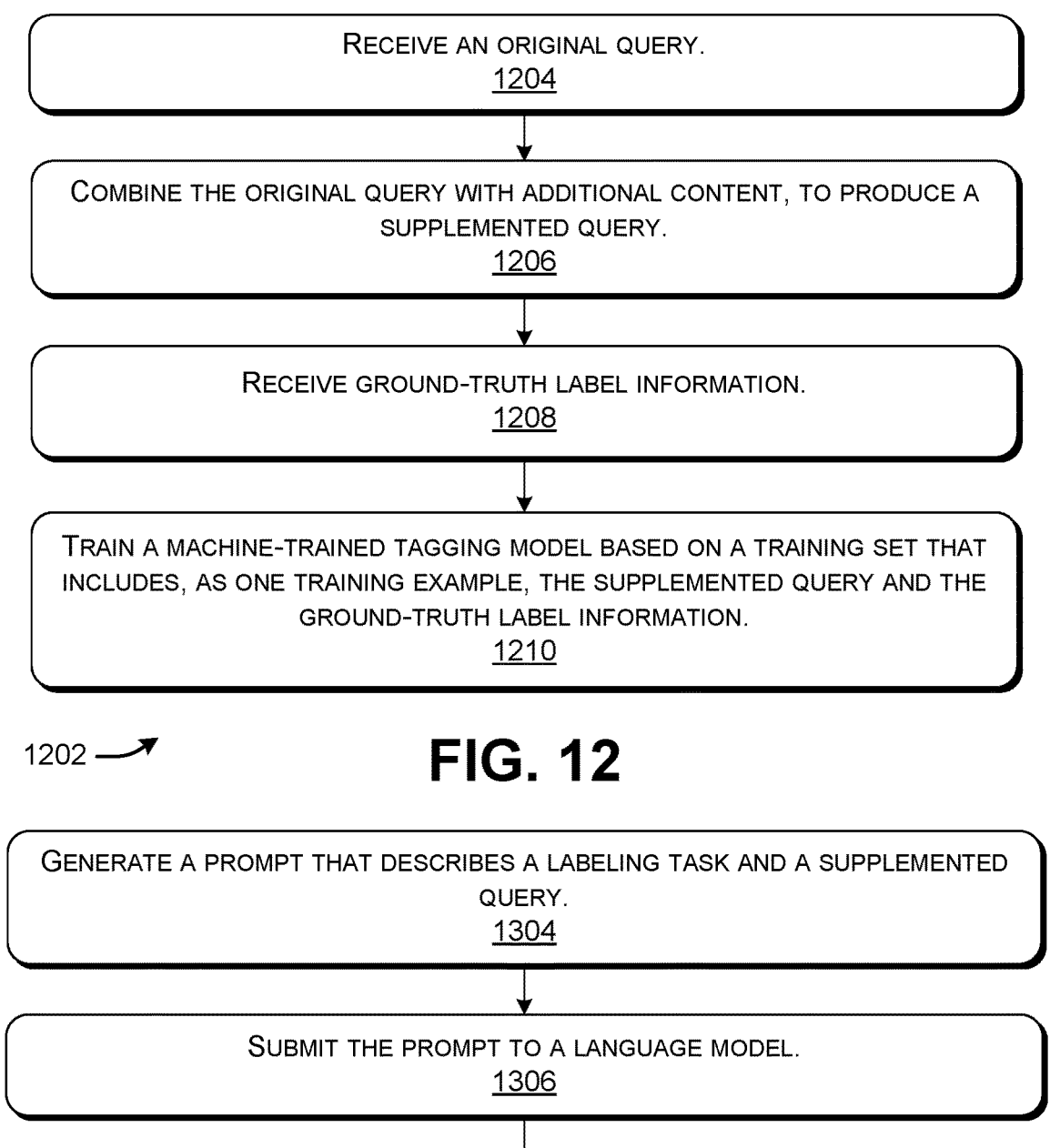

RECEIVE AN ORIGINAL QUERY.
1204

COMBINE THE ORIGINAL QUERY WITH ADDITIONAL CONTENT, TO PRODUCE A SUPPLEMENTED QUERY.
1206

RECEIVE GROUND-TRUTH LABEL INFORMATION.
1208

TRAIN A MACHINE-TRAINED TAGGING MODEL BASED ON A TRAINING SET THAT INCLUDES, AS ONE TRAINING EXAMPLE, THE SUPPLEMENTED QUERY AND THE GROUND-TRUTH LABEL INFORMATION.
1210

GENERATE A PROMPT THAT DESCRIBES A LABELING TASK AND A SUPPLEMENTED QUERY.
1304

SUBMIT THE PROMPT TO A LANGUAGE MODEL.
1306

RECEIVE A RESPONSE FROM THE LANGUAGE MODEL TO THE PROMPT THAT PROVIDES GROUND-TRUTH LABEL INFORMATION.
1308

TRAINING A MACHINE-TRAINED TAGGING MODEL BASED ON A TRAINING SET THAT INCLUDES, AS ONE TRAINING EXAMPLE, THE SUPPLEMENTED QUERY AND THE GROUND-TRUTH LABEL INFORMATION.
1310

MULTI-STAGE TRAINING OF A TAGGING MODEL WITH QUERY SUPPLEMENTATION AND ADVERSARIAL ENHANCEMENT

BACKGROUND

Machine-trained tagging models apply labels to the words in sentences. The labels identify the categories associated with the words. A tagging model, however, is less successful in applying labels to queries submitted to search engines. A tagging model's substandard performance with respect to queries negatively affects the quality of output results of any application that depends on the tagging model. For example, consider a system that serves target items (ads, documents, etc.) in response to a user's input query. The system will potentially serve content items that are not maximally relevant to the user's interests due to the failure of the tagging model to correctly interpret the parts of a query.

SUMMARY

A technique is described herein for training a tagging model that is able to successfully interpret queries. The technique trains the tagging model in plural stages. A first stage performs training on a pre-trained language model based on a set of queries, to produce a first-stage model. A second stage produces supplemented queries, each of which combines a query with one or more titles of documents that have been determined to match the query. The second stage then produces a second-stage model by performing further training of the first-stage model on the basis of the supplemented queries and an associated set of weak labels. A third stage produces a third-stage model by performing further training of the second-stage model based on the supplemented queries and an associated set of strong labels. The third stage also uses adversarial knowledge enhancement that improves the generalizability and robustness of the third-stage model by forcing the third-stage model to learn how to correctly classify hard training examples, as will be explained herein in greater detail. This, in turn, improves the generalization capabilities and robustness of the third-stage model. In some implementations, the third-stage model represents the tagging model for deployment in an inference-stage system.

According to another illustrative aspect, the weak labels used in the second stage are produced by a crowdsourcing platform and/or a machine-trained language model.

According to another illustrative aspect, the third stage uses a loss function that combines two instances of loss information. First loss information expresses the accuracy of the third-stage model as measured against the strong labels. Second loss information expresses an extent of adversarial loss in model predictions introduced into the training by perturbing input data.

The above-summarized technology is capable of being manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF DRAWINGS

FIG. 1 shows a multi-stage training system for training a tagging model using a multi-stage training process, and an inference-stage system for subsequently using the trained tagging model.

FIG. 4 shows an illustrative prompt for submission to a language model in the second-stage system of FIG. 3.

FIG. 11 is a flowchart that shows an illustrative manner of operation of the multi-stage training system of FIG. 1.

FIG. 12 is a flowchart that shows a process for generating supplemented queries with additional content, which is used in the second-stage system and the third-stage system.

FIG. 13 is a flowchart that shows a process for producing weak label information using a language model.

The same numbers are used throughout the disclosure and figures to refer to like components and features.

DETAILED DESCRIPTION

A query is typically much shorter than a complete sentence, e.g., including just a few terms. Further, most queries are ungrammatical in the sense that they do not conform to the same grammatical rules that apply to properly formed sentences. These factors make it difficult for a tagging model to interpret the parts of a query. For example, a tagging model may have difficulty interpreting the word "square" as a brand name in the query "credit card square." The technology described herein addresses this problem by providing an improved tagging model that is capable of successfully interpreting queries.

Figure 9:
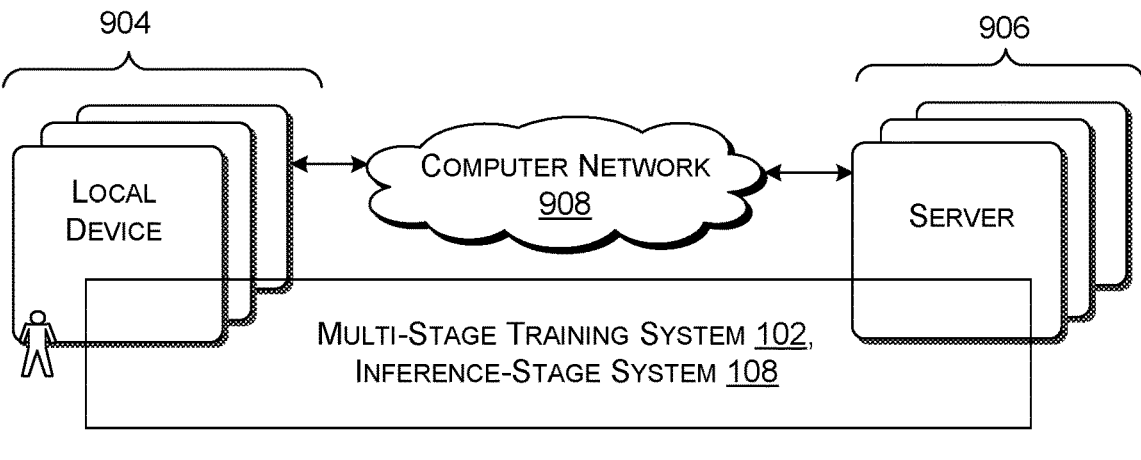
FIG. 9 shows computing equipment that, in some implementations, is used to implement the multi-stage training system and the inference-stage system of FIG. 1.
Figure 14:
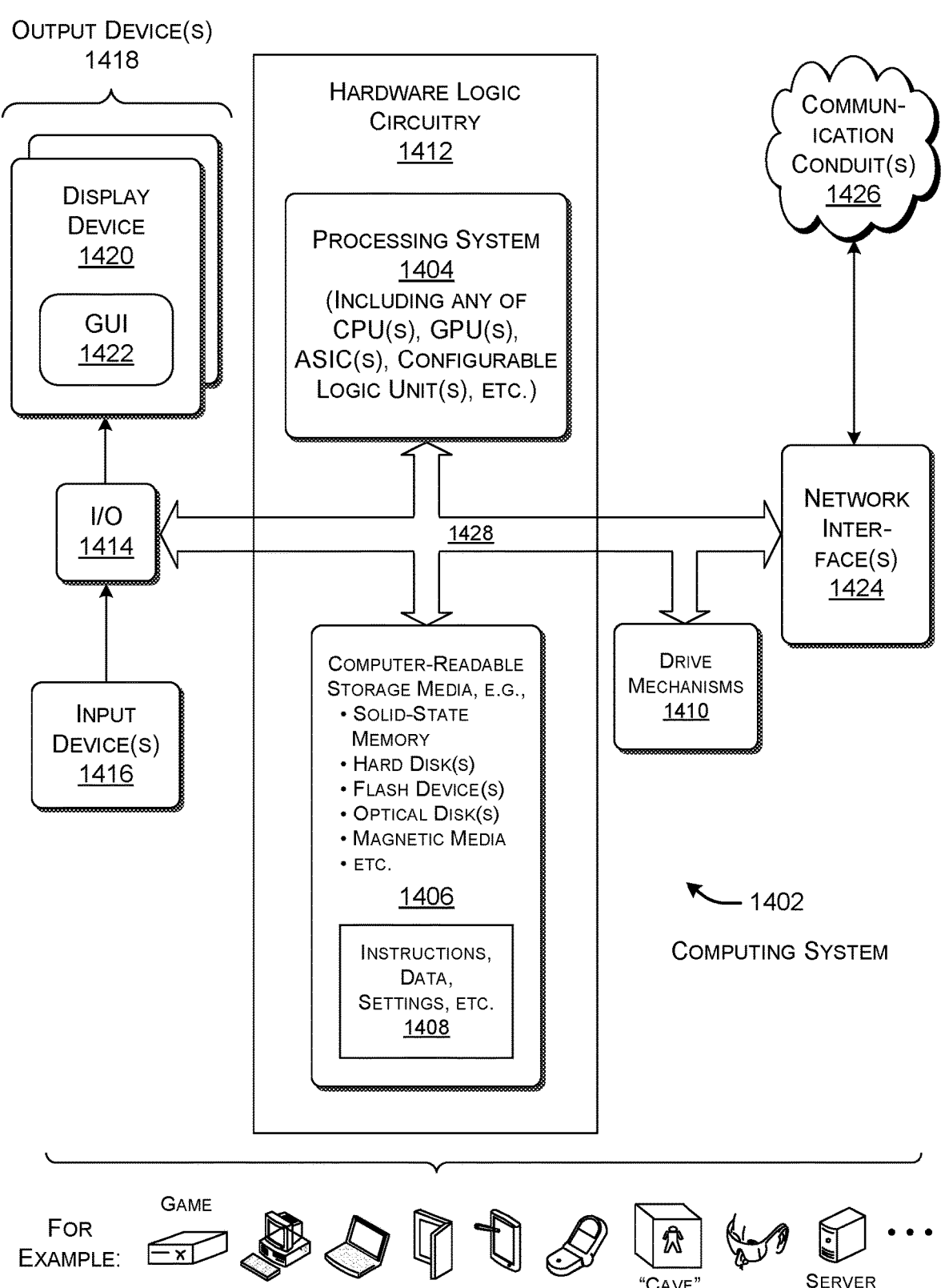
FIG. 14 shows an illustrative type of computing system that, in some implementations, is used to implement any aspect of the features shown in the foregoing drawings.

More specifically, FIG. 1 shows a multi-stage training system 102 for training a tagging model 104 using a multi-stage training process 106, and an inference-stage system 108 for subsequently using the trained tagging model 104 in an inference-stage process 110. The purpose of the tagging model 104 is to apply labels to queries submitted by users in performing searches. For example, the queries are web queries submitted by users via a browser application to a search system. As to terminology, terms such as "component," "module," "engine," and "tool" refer to parts of computer-based technology that perform respective functions. FIGS. 9 and 14, described below, provide examples of illustrative computing equipment for performing these functions.

In some implementations, the multi-stage training process 106 performs training that starts with a pre-trained transformer-based language model 112. For instance, in some implementations, the pre-trained transformer-based language model 112 is a BERT-type model, which, in its original state, has pre-trained parameters that are capable of being tuned for different uses and applications. Background information on the general topic of the BERT architecture is provided in Devlin, et al., "BERT: Pre-training of Deep Bidirectional Transformers for Language Understanding," in Proceedings of the 2019 Conference of the North American Chapter of the Association for Computational Linguistics: Human Language Technologies, Vol. 1 (Long and Short Papers), June 2018, pp. 4171-4186. In some examples, the pre-training of a language model includes, in part, unsupervised training using language modeling (e.g., predicting the next word in a given text passage and comparing the prediction with the actual next word, and/or predicting a masked word in a given text passage and comparing the prediction with the actual word that has been masked).

In a first stage of the multi-stage training process 106, a first-stage training system 114 performs further training of the pre-trained language model 112 based on a set of queries obtained from a data store 116. This yields a first-stage model 118. Generally, the first-stage training system 114 continues the kind of training that has been used in the preliminary stage to produce the pre-trained language model 112. But instead of performing training on a generic corpus of fully formed grammatical text passages, the first-stage training system 114 applies pre-training to the set of queries obtained from the data store 116. In some environments, the queries represent actual queries previously submitted by users to a search system. Most of the queries are short (e.g., one to four tokens) and ungrammatical.

In a second stage, an augmentation system 120 produces supplemented queries by combining queries obtained the from the data store 116 with document titles. That is, for each such query, the augmentation system 120 concatenates the query with one or more titles of documents that match the query. A label-generating system 122 produces weak label information for the supplemented queries using a crowdsourcing platform and/or a language model. As used herein, the terms "weak" and "strong" refer to levels of accuracy. The terms are to be understood in relation to each other; that is, a weak label is considered less accurate than a strong label, and vice versa. A second-stage training system 124 produces a second-stage model 126 by performing further training on the first-stage model 118 based on the supplemented queries and the weak label information.

In a third stage, a third-stage training system 128 produces a third-stage model 130 by performing training on the second-stage model 126, based on the supplemented queries produced by the augmentation system 120 and a set of strong label information. The third-stage training system 128 further includes a loss-generating component 132 that takes into consideration two loss measures. First loss information describes an extent to which the third-stage model 130 is producing accurate results, measured against the strong label information. Second loss information describes a discrepancy between predictions made by the third-stage model 130 based on unperturbed (original) data x and predictions made by the third-stage model 130 based on perturbed data x+δ. Perturbation of the input data makes it more difficult for the third-stage model 130 to interpret the input data, having the effect of transforming "easy" original examples into "hard" modified examples. "Perturbation" and "perturbing" as used herein refers to modifying the value of a data item. The third-stage model 130 constitutes the tagging model 104 used in the inference-stage process 110. In some implementations, the third-stage model 130 is relatively small, e.g., having 300M parameters, although the principles described herein are applicable to models of any size.

Now referring to the inference-stage system 108, in one inference-stage process 110, a user interacts with a user device 134 to enter a query 136, e.g., using a browser application installed on the user device 134. Alternatively, or in addition, an application produces the query 136 in response to the user's interaction with a particular web page or other content. For example, an application can identify the title and/or other identifier(s) of a news article or product page that the user is viewing, and automatically construct a query based on that title and/or identifiers.

In some implementations, the tagging model 104 is implemented as a service provided by a server system. In those cases, the user device 134 submits the query 136 to the server system via a computing network 138 (e.g., the Internet). In other implementations, the tagging model 104 is provided by the user device 134 or another computing system that is local with respect to the user.

In some implementations, an inference-stage augmentation system (not shown) performs the same role as the training-stage augmentation system 120 described above. That is, the augmentation system combines the submitted query 136 with one or more titles, to produce a supplemented query. The augmentation system retrieves these titles from a query-title log, or relies on a search system to identify the titles in real time by performing a search based the query. In other implementations, the inference-stage system 108 submits the original non-supplemented query 136 to the tagging model 104.

A tokenizer 140 (to be described below) produces tokens associated with the terms (T1, T2, . . . , TN) in the query 136 (and optionally the appended titles, if any). Based on these tokens, the tagging model 104 assigns a label to each term in the query 136, to produce a labeled query 142. An individual label identifies a category to which a term most likely corresponds.

In one application environment, illustrative categories are "purchase intent" (e.g., specifying whether or not a user intends to buy a product or is just browsing for products of a particular kind), brand, product (specifying a general class or products), product model, specification attribute, location, etc. For example, consider a user who inputs the query "buy apple iphone 13 128 gb black paris." The tagging model 104 identifies the term "buy" as pertaining to a purchase intent, the term "apple" as a referring to a brand, the term "iphone" as referring to a product, the term "13" as referring to a product model, the terms "128 gb" and "black" as referring to specification attributes, and the term "paris" as referring to a location.

A post-processing component 144 leverages the labels produced by the tagging model 104. For example, in some implementations, the post-processing component 144 is a retrieval engine that retrieves one or more target items from a data store 146 that match the query 136 based, in part, on the labeled query 142. The retrieval engine is capable of performing this retrieval function in any manner, e.g., using or lexical-based lookup operation and/or a vector-based lookup operation. In a lexical-based lookup operation, the retrieval engine finds the target item(s) that that are lexically most similar to the query 136, and which share some or all of the same labels as the query 136. In a vector-based lookup operation, the retrieval engine converts all of the information available about the query 136 to a distributed query vector (e.g., using a neural network), and then finding pre-generated target vectors that are most similar to the query vector, e.g., using cosine similarity or any other distance metric. The target vectors are associated with respective target items.

In some applications, the target items are digital ads ("ads"), documents, files, etc. In one advertising context, the post-processing component 144 uses the term in the query 136 that has been identified as a brand to ensure that any ads served to the user do not pertain to another brand. For example, the post-processing component 144 will ensure that a query 136 that asks about a car produced by a particular car manufacturer will not result in the delivery of an ad associated with a car produced by a competing car manufacturer. This safeguard is appropriate because a user who performs a search for a particular brand of car is unlikely to be interested in a car by another maker. This safeguard further helps comply with the objectives of advertisers. Any car manufacturer will not likely want to pay for ads delivered to someone who has submitted a query that evinces interest in a competing brand.

As an outcome of the above operations, the post-processing component 144 delivers one or more target items (or information about the target items) to the user device 134 via the computing network 138. For instance, the post-processing component 144 sends one or more digital ads to the user via a browser application, e.g., in the context of a search results page or whatever web page the user happens to be viewing at the moment. The multi-stage training process 106 improves the accuracy and generalizability of the tagging model 104, which, in turn, reduces the number of ads of low relevance that are served to a user. This, in turn, reduces the use of memory, processor, and communication resources in the delivery of target items. It also reduces the amount of informational noise that is presented to the user.

The item-retrieval application described above is to be understood as illustrative. Other post-processing components leverage the labels produced by the tagging model 104 to rewrite the query 136, to block certain types of content from being delivered to the user, to extract an attribute associated with a term in a query or answer submitted to any type of dialogue engine (e.g., a chat bot), and so on.

In some implementations, the tagging model 104 has a single-pass architecture, which means that the tagging model 104 transforms input data to output data in a single pass. This single-pass architecture allows the tagging model 104 to quickly map input tokens to label predictions, e.g., in a few milliseconds, which reduces the latency of any downstream application that relies on the tagging model 104.

FIGS. 2-8 present further illustrative details regarding the operation of the multi-stage training system 102 of FIG. 1. Starting with FIG. 2, this figure shows one implementation of the first-stage training system 114. A tokenizer 202 receives a query from the query repository in the data store 116 and maps the query to a sequence of input tokens 204. A "token" refers to a unit of information processed by a machine-trained model, such as a word or a part of a word. Further, a query is said to be composed of tokens in a general sense (in which "token" is a synonym of "part"), irrespective of when and where those tokens are actually produced.

Assume that the query is composed of plural terms (term1, term2, . . . , termN). The tokenizer 202 assigns an input token to each term. Optionally, the tokenizer 202 also uses any type of special token (e.g., a "CLS" token) to designate the start of the query and any type of special token (e.g., a "SEP" token) to designate the end of the query. The CLS token and the SEP token map to predetermined fixed token IDs. Further, in this stage of training, the tokenizer 202 replaces at least one term with a mask token, which is any type of dummy token that represents the masking out of a term in the query.

The first-stage model 118 maps the sequence of input tokens 204 to a sequence of output embeddings (not shown). An "embedding" is a distributed vector that represents a token in a vector space. The first-stage model 118 maps the output embeddings to a sequence of term predictions 206, e.g., using a linear feed-forward neural network followed by a softmax component (also referred to as a normalized exponential function).

A loss-generating component 208 computes loss information that expresses a difference between the prediction for the masked term and the actual masked term, e.g., using cross entropy. A parameter-updating component 210 uses the loss information to update the parameters (e.g., the weights) of the first-stage model 118, e.g., using stochastic gradient descent in combination with back propagation.

Figure 2:
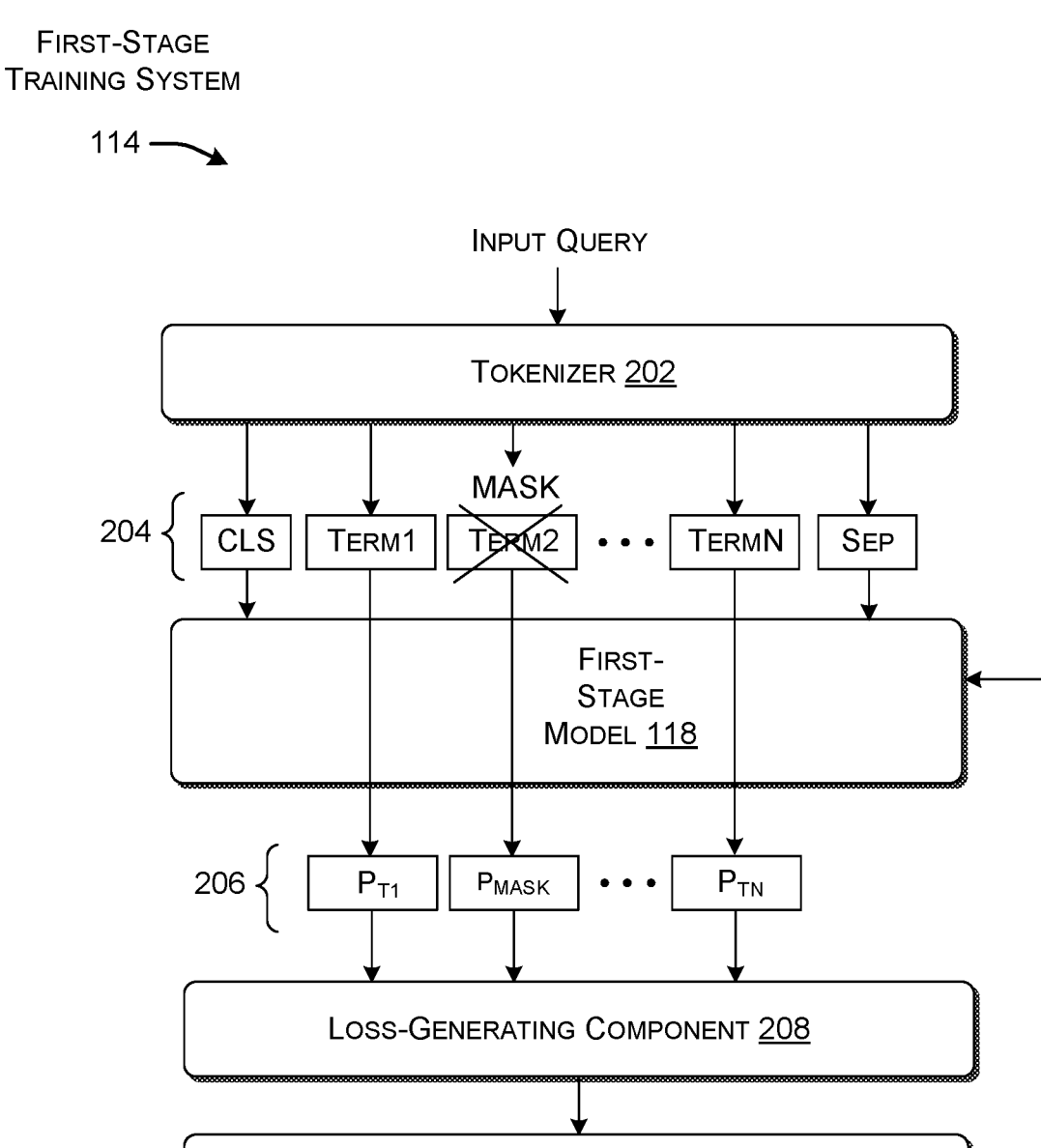
FIG. 2 shows a first-stage system of the multi-stage training system of FIG. 1.
Figure 3:
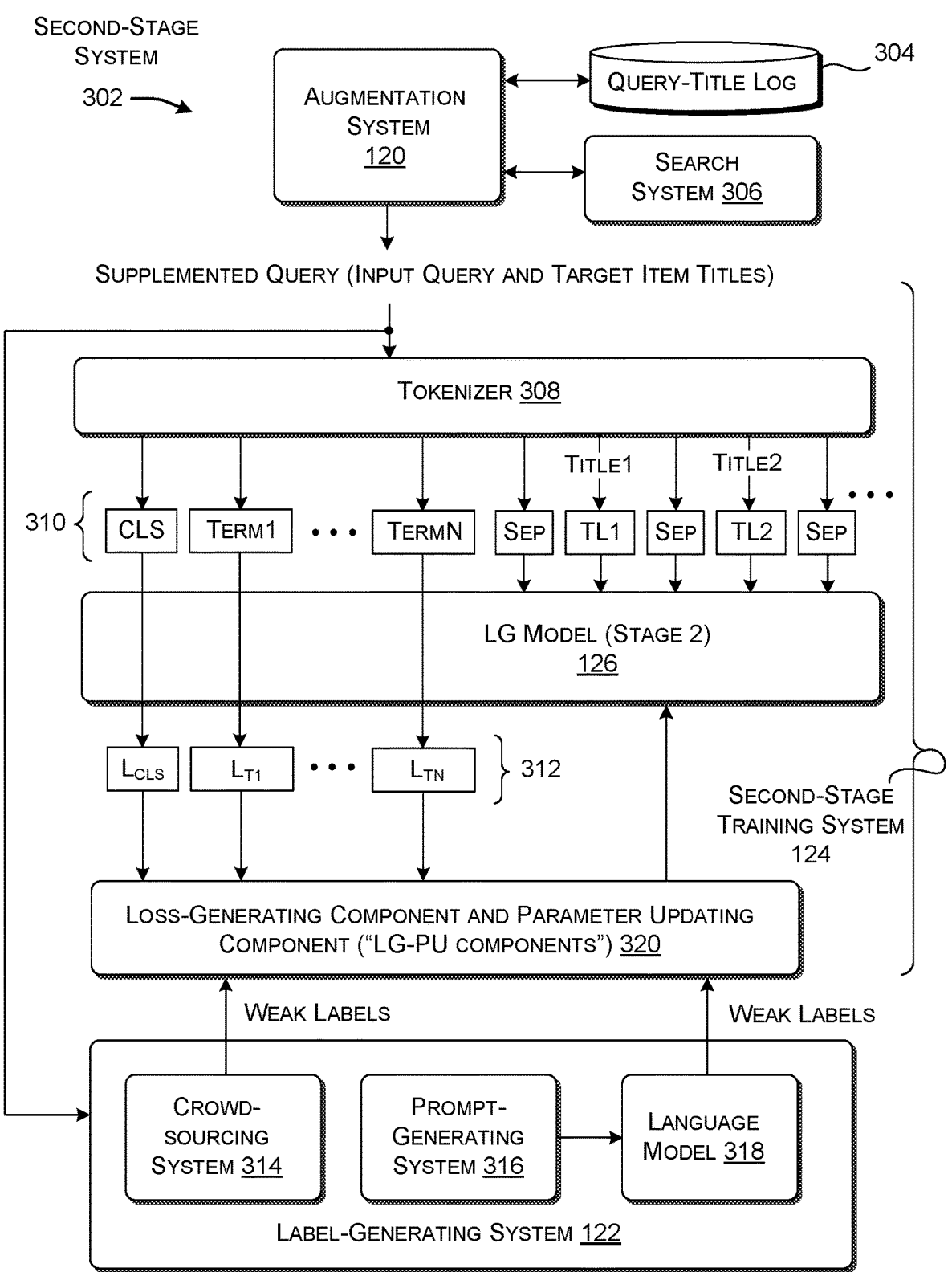
FIG. 3 shows a second-stage system of the multi-stage training system of FIG. 1.

FIG. 3 shows one implementation of a second-stage system 302 that is used to perform the second stage of training shown in FIG. 1. In a preliminary operation, the augmentation system 120 identifies one or more target items that match each query in a training set, and then appends those titles to the query. This operation yields a supplemented query.

In some implementations, the augmentation system 120 consults a query-title log in a data store 304 for titles that match an original query under consideration. The query-title log identifies previous queries submitted by users to a search system 306, and respective sets of titles of documents that have been determined by the search system 306 to match those queries. Alternatively, or in addition, the augmentation system 120 directly requests the search system 306 to perform a new search for each query under consideration, upon which the search system 306 produces a list of documents that match the query. The augmentation system 120 extracts the titles of the N most relevant documents (where N is an implementation-specific parameter), as ranked by the search system 308. Alternatively, or in addition, the augmentation system 120 extracts supplemental data from other parts of matching documents (besides the titles), and/or extracts supplemental data from some other source(s) (e.g., knowledge graphs).

A tokenizer 308 produces a sequence of input tokens 310 based on a supplemented query. That is, the input tokens 310 includes a sequence of tokens associated with the terms in the original query concatenated with the titles of the matching documents. The tokenizer 308 adds a special "SEP" token between the query and the first tile, and between each successive title. The "SEP" conveys the separation between different parts of the supplemented query.

The second-stage model 126 maps the sequence of input tokens 310 to a sequence of output embeddings (not shown), and then maps the sequence of output embeddings to a sequence of labels 312. In some implementations, the second-stage model 126 is implemented as a BERT-type encoder model. The second-stage model 126 is produced by transforming the first-stage model 118. In some implementations, the second-stage model 126 includes a post-processing classification layer that transforms the output information produced by preceding transformer blocks into the labels 312. In some implementations, the second-stage model 126 does not produce labels for the terms in the titles. Hence, FIG. 3 omits depiction of labels associated with the terms in the titles.

The label-generating system 122 generates weak labels for the supplemented queries using two approaches. Collectively, the labels constitute ground-truth label information. In a first approach, a crowd-sourcing system 314 enables human labelers to apply labels to the terms of the queries in the supplemented queries. The labels are considered "weak" because, in some implementations, the human labelers are not experts in the task of labeling queries.

In a second approach, a prompt-generating system 316 produces a prompt for each supplemented query that describes the supplemented query and provides instructions that explain how to perform the labeling task. A machine-trained language model 318 generates a response based on the prompt that specifies labels for the terms in the original query. The language model 318 is provided by a server system or is local with respect to other components of the second-stage system 302. In some implementations, the language model 318 is any type of transformer-based language model. In some examples, the language model 318 represents any model in the GPT family of language models provided by OpenAI of San Francisco, California, such as the ChatGPT model. The labels produced by the language model 318 are considered weak because they are, on average, less accurate than the labels manually assigned by experts.

The label-generating system 122 allows a large amount of labels to be quickly and inexpensively collected. This overcomes the problem of label scarcity with respect to queries. Considered by itself, the label information is characterized as a weak, as stated above. However, the label information is used in the context of a three-stage training operation that effectively fortifies the weak label information and neutralizes the noise associated therewith. In alternative training approaches, by contrast, the use of noisy labels degrades the performance of the tagging models.

A loss-generating component and parameter-updating component ("LG-PU components") 320 generate loss information that expresses a difference between the predicted label information (in the sequence of labels 312) and the ground-truth label information produced by the label-generating system 122. In some implementations, the LG-PU components 320 specifically formulate the loss information using cross entropy. The LG-PU components 320 then update the parameters of the second-stage model 126 based on the loss information, e.g., using stochastic gradient descent in combination with backpropagation.

FIG. 4 shows an illustrative prompt 402 submitted to the language model 318. A first part 404 of the prompt 402 describes the task that the language model 318 is expected to perform. The first part 404 also optionally includes one or more examples 406 that demonstrate how to perform the task. In some implementations, the prompt 402 formulates each example using chain-of-thought reasoning. An illustrative example 408 demonstrates chain-of-thought reasoning for a particular query that reads: "buy apple iphone 13 128 gb black paris." The chain-of-thought explanation describes how the language model 318 is expected to reason about the supplemented query based, in part, on information imparted by the titles in the supplemented query. A second part 410 of the prompt 402 describes the specific supplemented query that is being submitted to the language model 318 at the present time, for which label information is sought.

Other implementations use other strategies to express the query in a prompt. These strategies include: generating a prompt without examples; generating a prompt with examples, but not expressed using chain-of-thought reasoning; generating a prompt that includes examples specifically selected to complement the query, and so on.

Figure 5:
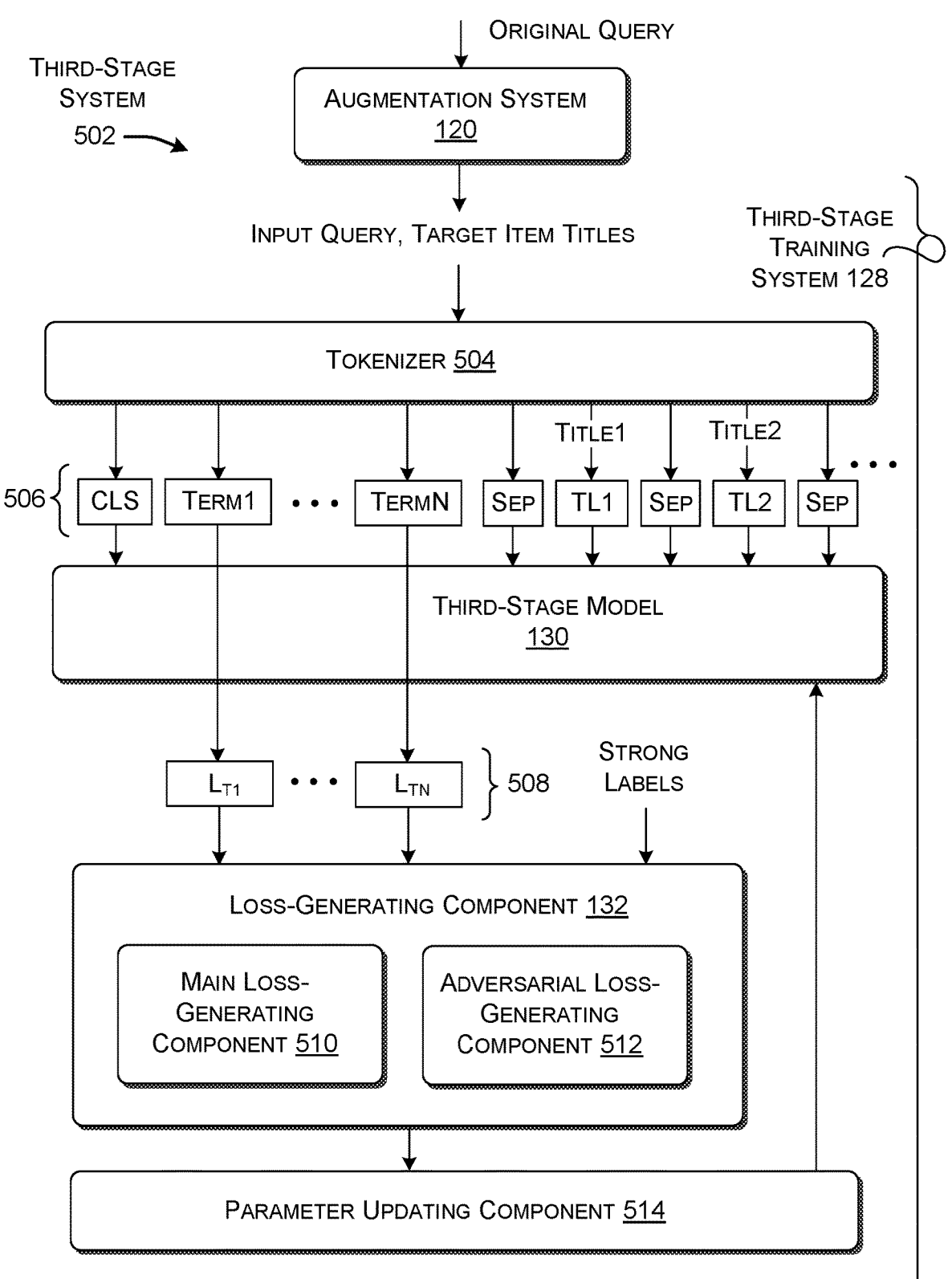
FIG. 5 shows a third-stage system of the multi-stage training system of FIG. 1.

FIG. 5 shows one implementation of a third-stage system 502 that implements the third stage of the multi-stage training process 106. As before, the augmentation system 120 appends one or more titles to each original query in a training set, to produce a supplemented query. In this case, however, the label-generating system 122 (not shown in FIG. 5) solicits strong ground-truth label information from human experts, e.g., via the crowd-sourcing system 314 of FIG. 3.

A tokenizer 504 maps the supplemented query into a sequence of input tokens 506 in the same manner described above with respect to the second-stage system 302. The third-stage model 130 then maps the input tokens to output embeddings (not shown), and then transforms the output embeddings into a sequence of labels 508. The third-stage model 130 represents a fine-tuned version of the second-stage model 126, which, as previously described, can be implemented as a BERT-type encoder model.

The loss-generating component 132 produces loss information for the supplemented query that is a combination of first loss information and second loss information. An accuracy-based loss-generating component 510 generates the first loss information (also referred to as the accuracy loss), while an adversarial loss-generating component 512 generates the second loss information (also referred to as the adversarial loss). Generally, the first loss information describes the difference between the model-generated label information (as expressed in the sequence of labels 508) and the ground-truth label information provided by the human experts. The second loss information expresses a difference between the model-generated label information produced based on original input data x and a modified version of the model-generated label information that is produced by shifting the input data x by a small amount 8. More specifically, the adversarial loss-generating component 512 iteratively shifts the input data x to maximize the above-described difference. In some implementations, x refers to input embedding information that represents the input tokens 506 (rather than the input tokens 506 themselves).

In some cases, the perturbation of x causes the third-stage model 130 to potentially produce incorrect label information. In this sense, it can be said that the perturbation of x transforms the training example associated with the supplemented query into a "hard" training example. The training example is "hard" insofar as the third-stage model 130 has difficulty determining the correct label information for the training example. Generally, the third-stage training system 128 improves the generalizability and robustness of the third-stage model 130 by forcing the third-stage model 130 to learn how to correctly classify hard training examples. It is therefore advantageous to artificially create these hard training examples based on the existing training set (which may not originally include a sufficient number of hard training examples).

One formulation of a loss equation that takes into account the first loss information and the second loss information is expressed as follows:

$$\min_{\theta} \frac{1}{n} \sum_{i=1}^{n} \left( \ell(f(x_i, \theta), y_i) + \max_{\|\delta_i\| \le \epsilon} \ell_v(x_i, \delta_i, \theta) \right). \tag{1}$$

In this equation, n represents the number of training examples, $\theta$ represents the parameters of the third-stage model 130, $x_i$ represents the input data (transformed into an embedding space) provided to the third-stage model 130 that is associated with a supplemented query, $y_i$ represents the ground-truth label information, $\delta_i$ represents an amount by which $x_i$ is offset, and $\epsilon$ represents the bounds of permissible perturbation. More generally, the first part $\ell(\bullet)$ of Equation (1) represents the first loss information, which expresses an extent to which the third-stage model 130 has produced an accurate label prediction. The second part $\ell_\upsilon(\bullet)$ of Equation (1) represents the second loss information, which expresses an extent of adversarial loss injected into the training operation. In other words, the second loss information represents the difference between the model-generated label information for "clean" (original or unperturbed) data x and the perturbed data x+δ. Overall, the loss-generating component seeks to minimize the results of Equation (1) for all of the n training examples.

In some implementations, the second loss information can be expressed as:

$$\ell_\upsilon(x, \delta, \theta) = SymKL(f(x, \theta), f(x + \delta, \theta)). \quad (2)$$

Here, $$SymKL(P, Q) = \frac{1}{2}(KL(P\|Q) + KL(Q\|P))$$

represents the symmetric KL-divergence between two probability distributions (P and Q). In some implementations, $\|\bullet\|$ represents the $L_2$ norm or the $L_\infty$ norm.

In some implementations, for any given iteration, the loss-generating component 132 first computes the second loss information by iteratively finding the maximum adversarial loss. The loss-generating component 132 then performs the remainder of the computations of Equation (1), e.g., by computing the difference between the model-generating label information and the ground-truth label information $(y_i)$, and adding this result to the previously-computed adversarial loss.

More specifically, in some implementations, the loss-generating component 132 iteratively finds the maximum adversarial loss using projected gradient ascent, based on the following update rule that describes how to advance from a current perturbation $\delta_k$ to an updated perturbation $\delta_{k+1}$:

$$\delta_{k+1} = \Pi\left(\delta_k + \eta\frac{\nabla_\delta\ell_\upsilon(x, \delta_k, \theta)}{\|\nabla_\delta\ell_\upsilon\|_2}\right). \quad (3)$$

The second term of Equation (3) represents the gradient of the adversarial loss divided by the $L_2$ norm of the gradient of the adversarial loss, and multiplied by a learning rate $\eta$ (which is a hyper-parameter). This result is added to the current perturbation $\delta_k$, to produce the updated perturbation $\delta_{k+1}$. $\Pi(\bullet)$ is a projection operation that represents the projection of the above-captured result onto a constraining surface $\|\bullet\|$.

Finally, a parameter-updating component 514 performs the actual task of updating the parameters of the third-stage model 130 based on the above-computed loss information. Overall, the introduction of hard examples by perturbing x is referred to as virtual adversarial knowledge augmentation or enhancement. The samples produced by the perturbation are said to be "virtual" because they do not exist in the training set in original form, but rather are produced by offsetting the original training data.

Figure 6:
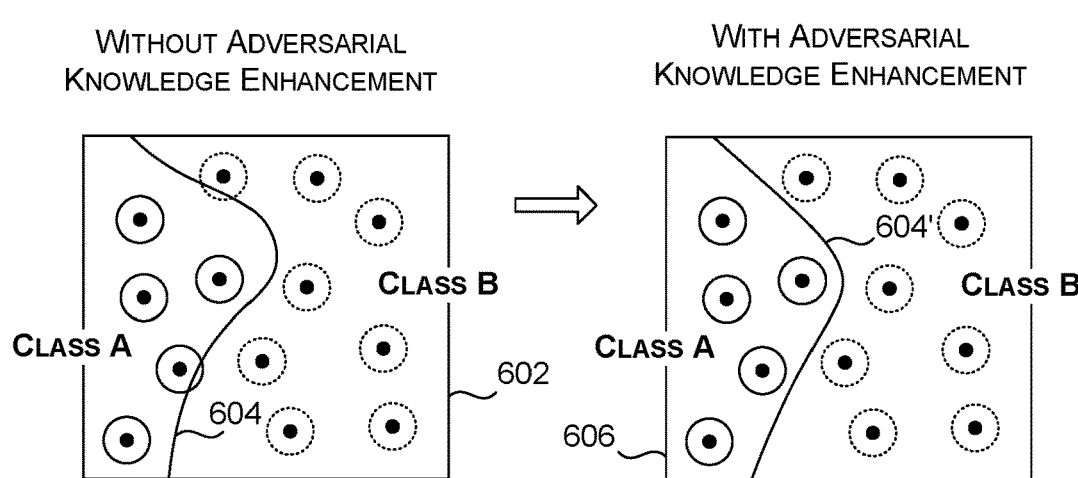
FIG. 6 shows how, in the third-stage system of FIG. 5, adversarial knowledge enhancement improves the ability of the tagging model to distinguish between two classes.
Figures 7, 8:
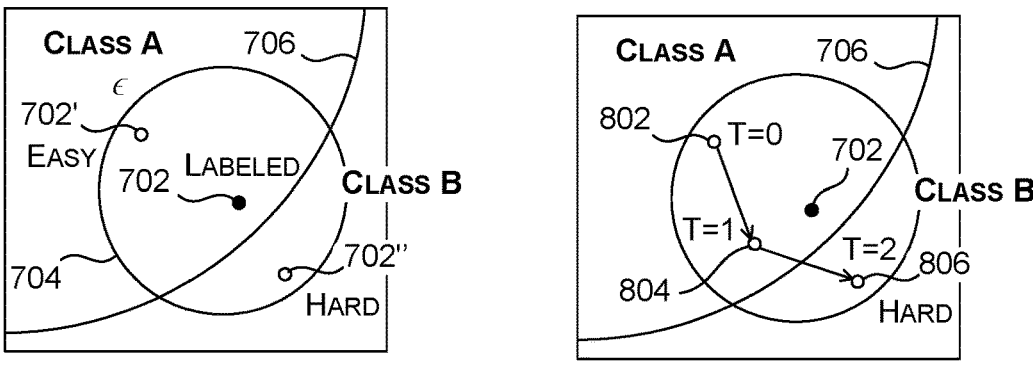
FIG. 7 illustrates the concept of "hard" and "easy" training examples.
FIG. 8 shows an iterative process for identifying a hard training example.

FIGS. 6-8 graphically illustrate some of the above-described concepts in simplified form. Starting with FIG. 6, the left panel 602 shows a decision boundary 604 that separates two classes (i.e., Class A and Class B) of data samples in vector space, prior to performing perturbation of the input data. Each black dot represents a data sample. The circle around each data sample represents an amount e by which the data sample is permitted to be perturbed. Optimally, a small perturbation of a data sample should not cause the third-stage model 130 to misclassify the data sample. That is, for a data sample correctly labeled as Class A, a small perturbation of the data sample should result in the third-stage model 130 still classifying the data sample as Class A. But this is not true for all data samples shown in the left panel 602 because, in the current state of training, the decision boundary 604 intersects the perturbation boundaries of at least two data samples.

A right panel 606 shows a modified decision boundary 604' between the two classes after training using adversarial enhancement has been performed. In its modified state, the decision boundary 604 is smoothed out and adjusted such that it does not intersect any perturbation zone associated with any data sample. As described above, adversarial augmentation also improves the generalizability and robustness of the third-stage model 130.

FIG. 7 shows an enlarged view of an original data sample 702 which has been correctly labeled by the third-stage model 130 as Class A. An outer circle 704 represents a boundary of an area in which the original data sample 702 is permitted to be perturbed. However, not all perturbations within this area will force the third-stage model to learn new information during the training process. For example, assume that a data sample 702' represents the original data sample 702 when it is moved to a new position that is comfortably within a cluster of data samples that have been labeled as Class A, and which is far from a decision boundary 706 that separates Class A from Class B. The third-stage model 130 is able to easily classify this data sample 702' as belonging to class A without learning any new information. In contrast, assume that the data sample 702" represents the data original sample 702 when it is moved to the opposite side of the decision boundary 706. The third-stage model 130 will incorrectly classify the data sample 702" as Class B (when, in fact, it should be classified as Class A). The data sample 702" therefore represents a hard training example that will force the third-stage model 130 to adjust its parameters to reduce the likelihood of misclassifying the data sample 702". FIG. 8 shows how the adversarial loss-generating component 512 iteratively moves the original data sample 702 from a position 802, to position 804, to position 806 in successive steps. The initial position 802 is randomly chosen.

The final tagging model 104 produced by the multi-stage training system 102 classifies queries with higher accuracy than competing approaches. For example, consider a BERT-based model that is directly trained on queries having strong labels. The BERT-based model has an F1 score of 74.41 with respect to the task of classifying all label categories, and an F1 score 80.77 with respect to the narrower task of classifying the brand category. In contrast, the tagging model 104 described above has an F1 score of 77.94 for all label categories, and an F1 score of 83.45 for the brand category. Correctly classifying the brand category is important in some applications for the reasons set forth above.

The individual stages set forth above all contribute to the superior performance of the tagging model 104. For example, without the type of training in stage 1, the tagging model 104 has an F1 score of 77.41 for all label categories. As stated above, with the first-stage training, the tagging model 104 has an F1 score of 77.94. Without the consideration of adversarial loss in the third stage, the tagging model 104 has an F1 score of 77.10 for all label categories. As stated above, with the use of adversarial loss, the F1 score of the tagging model is 77.94. Without the use of any web titles in the second stage, the tagging model 104 has an F1 score of about 76.00 for all label categories, and the average query length is about 3.9 tokens. With the use of three web titles, the tagging model 104 has an F1 score of about 77.94 and has an average query length of about 20.8 tokens.

These improvements allow an information provider (such as an advertising platform) to reduce the amount of target items of low relevance that it sends to a user. This, in turn, enables the information provider to provide fewer target items to the user, insofar as the target items that it does send can be expected to be impactful. Reducing the flow of low-relevance target items reduces the consumption of resources and reduces the amount of noise that is presented to the user.

FIG. 9 shows computing equipment 902 that, in some implementations, is used to implement the multi-stage training system 102 and/or the inference-stage system 108 of FIG. 1. The computing equipment 902 includes a set of local devices 904 coupled to a set of servers 906 via a computer network 908. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, a media device, a vehicle-borne computing system, any type of robot computing system, a computing system in a manufacturing system, etc. In some implementations, the computer network 908 is implemented as a local area network, a wide area network (e.g., the Internet), one or more point-to-point links, or any combination thereof.

The bottom-most overlapping box in FIG. 9 indicates that the functionality of the multi-stage training system 102 and/or the inference-stage system 108 is capable of being spread across the local devices 904 and/or the servers 906 in any manner. In one example, the multi-stage training system 102 and/or the inference-stage system 108 is entirely implemented by a local device. In another example, the functions of the multi-stage training system 102 and/or the inference-stage system 108 is entirely implemented by the servers 906. Here, a user is able to interact with the servers 906 via a browser application running on a local device. In other examples, some of the functions of the multi-stage training system 102 and/or the inference-stage system 110 are implemented by a local device, and other functions of the multi-stage training system 102 and/or the inference-stage system 108 are implemented by the servers 906. In some implementations of the inference-stage system 108, for example, a browser application is implemented by the user device 134, and the remainder of the components are implemented by a server-based system. In some implementations of the multi-stage training system 102, the language model 318 is implemented by a server-based system, and the remainder of the components are implemented by a local device.

Figure 10:
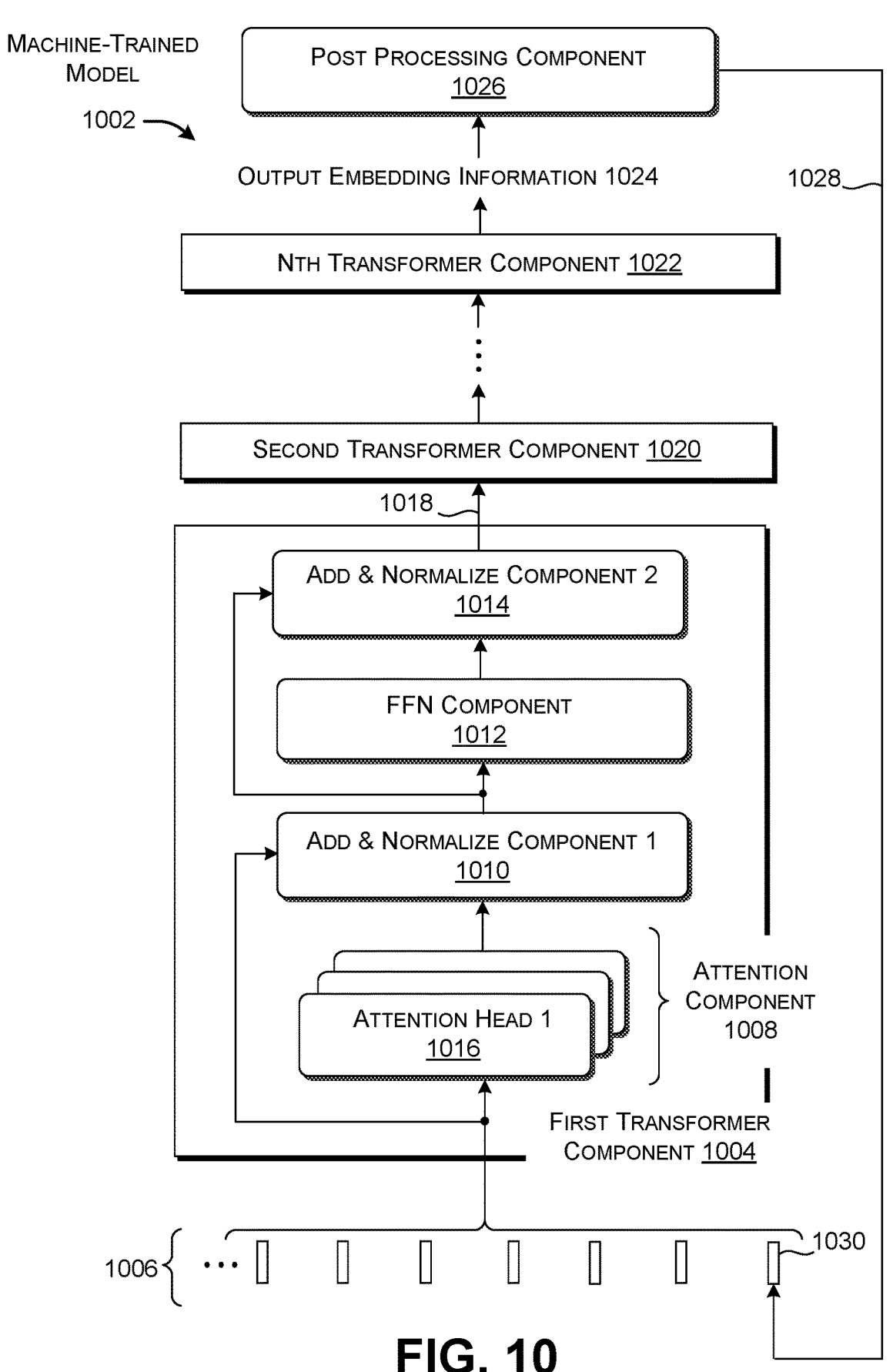
FIG. 10 shows an illustrative language model for implementing the tagging model and a language model used in the second-stage system.

FIG. 10 shows a transformer-based language model ("language model") 1002 for implementing the tagging model

104 referenced by FIG. 1 and/or the language model 318 shown in FIG. 3. The language model 1002 is composed, in part, of a pipeline of transformer components, including a first transformer component 1004. FIG. 10 provides details regarding one way to implement the first transformer component 1004. Although not specifically illustrated, other transformer components of the language model 1002 have the same architecture and perform the same functions as the first transformer component 1004 (but are governed by separate sets of weights).

The language model 1002 commences its operation with the receipt of input information, such as a query or passage of text. The prompt includes a series of linguistic tokens. In some examples, a "token" refers to a unit of text having any granularity, such as an individual word, a word fragment produced by byte pair encoding (BPE), a character n-gram, a word fragment identified by the WordPiece or Sentence-Piece algorithm, etc. To facilitate explanation, assume that each token corresponds to a complete word.

Next, an embedding component (not shown) maps the sequence of tokens into respective token embeddings. For example, the embedding component produces one-hot vectors that describe the tokens, and then maps the one-hot vectors into the token embeddings using a machine-trained linear transformation. The embedding component then adds position information (and, in some cases, segment information) to the respective token embeddings to produce position-supplemented embedding vectors 1006. The position information added to each token embedding describes the embedding vector's position in the sequence of token embeddings.

The first transformer component 1004 operates on the position-supplemented embedding vectors 1006. In some implementations, the first transformer component 1004 includes, in order, an attention component 1008, a first add-and-normalize component 1010, a feed-forward neural network (FFN) component 1012, and a second add-and-normalize component 1014.

The attention component 1008 determines how much emphasis should be placed on parts of input information when interpreting other parts of the input information. Consider, for example, a sentence that reads: "I asked the professor a question, but he could not answer it." When interpreting the word "it," the attention component 1008 will determine how much weight or emphasis should be placed on each of the words of the sentence. The attention component 1008 will find that the word "question" is most significant.

The attention component 1008 performs attention analysis using the following equation:

$$\text{Attention}(Q, K, V) = \text{softmax}\left(\frac{QK^T}{\sqrt{d_k}}\right)V. \tag{4}$$

The attention component 1008 produces query information Q by multiplying the position-supplemented embedding vectors 1006 by a query weighting matrix $W^Q$. Similarly, the attention component 1008 produces key information K and value information V by multiplying the position-supplemented embedding vectors 1006 by a key weighting matrix $W^K$ and a value weighting matrix $W^V$, respectively. To execute Equation (4), the attention component 1008 takes the dot product of Q with the transpose of K, and then divides the dot product by a scaling factor $\sqrt{d}$, to produce a scaled result. The symbol d represents the dimensionality of Q and K. The attention component 1008 takes the softmax (normalized exponential function) of the scaled result, and then multiplies the result of the softmax operation by V, to produce attention output information. More generally stated, the attention component 1008 determines how much emphasis should be placed on each part of input embedding information when interpreting other parts of the input embedding information, and when interpreting the same part. In some cases, the attention component 1008 is said to perform masked attention insofar as the attention component 1008 masks output token information that, at any given time, has not yet been determined. Background information regarding the general concept of attention is provided in Vaswani, et al., "Attention Is All You Need," in 31st Conference on Neural Information Processing Systems (NIPS 2017), 2017, 11 pages.

Note that FIG. 10 shows that the attention component 1008 is composed of plural attention heads, including a representative attention head 1016. Each attention head performs the computations specified by Equation (4), but with respect to a particular representational subspace that is different than the subspaces of the other attention heads. To accomplish this operation, the attention heads perform the computations described above using different respective sets of query, key, and value weight matrices. Although not shown, the attention component 1008 concatenates the output results of the attention component's separate attention heads, and then multiplies the results of this concatenation by another weight matrix $W^\circ$.

The add-and-normalize component 1010 includes a residual connection that combines (e.g., sums) input information fed to the attention component 1008 with the output information generated by the attention component 1008. The add-and-normalize component 1010 then normalizes the output information generated by the residual connection, e.g., by layer-normalizing values in the output information based on the mean and standard deviation of those values, or by performing root-mean-squared normalization. The other add-and-normalize component 1014 performs the same functions as the first-mentioned add-and-normalize component 1010. The FFN component 1012 transforms input information to output information using a feed-forward neural network having any number of layers.

The first transformer component 1004 produces output information 1018. A series of other transformer components (1020, . . . , 1022) perform the same functions as the first transformer component 1004, each operating on output information produced by its immediately preceding transformer component. Each transformer component uses its own level-specific set of machine-trained weights. The final transformer component 1022 in the language model 1002 produces final output information 1024.

In some implementations, a post-processing component 1026 performs post-processing operations on the final output information 1024. In the case of the tagging model 104, the post-processing component 1026 can be implemented, for instance, as any type of feed-forward neural network. Here, the output of the post-processing component 1026 is label information, and the preceding transformer components constitute an encoder. In the case of the language model 318, the post-processing component 1026 can be implemented as a machine-trained linear layer followed by a softmax component (not shown). Here, the output of the post-processing component 1026 is a prediction of the next token to follow the last-submitted token, and the preceding transformer components constitute a decoder (in a standalone decoder architecture).

In the case of the language model 318, the language model 1002 operates in an auto-regressive manner, as indicated by the loop 1028. To operate in this way, the language model 1002 appends a predicted token to the end of the sequence of input tokens, to provide an updated sequence of tokens. The predicted token leads to the production of a new position-supplemented vector 1030. In a next pass, the language model 1002 processes the updated sequence of position-supplemented vectors to generate a next predicted token. The language model 1002 repeats the above process until it generates a specified stop token.

Other implementations of the language model 1002 use an encoder-decoder transformer-based architecture. Here, a transformer-based decoder receives encoder output information produced by a transformer-based encoder, together with decoder input information. The encoder output information specifically includes KV information that serves an input to the attention components of the decoder (except the first transformer component).

Other implementations of the language model 1002 use other kinds of machine-trained models besides, or in addition to, the particular transformer-based architecture shown in FIG. 10. The other machine-trained models include any of convolutional neural networks (CNNs), recurrent neural networks (RNNs), feed-forward neural networks (FFNS), etc., or any combination thereof.

FIGS. 11-13 show three processes that represent an overview of the operation of the multi-stage training system 102 of FIG. 1. Each of the processes is expressed as a series of operations performed in a particular order. But the order of these operations is merely representative, and the operations are capable of being varied in other implementations. Further, any two or more operations described below are capable of being performed in a parallel manner. In one implementation, the blocks shown in the processes that pertain to processing-related functions are implemented by the computing equipment described in connection with FIGS. 9 and 14.

More specifically, FIG. 11 shows a process 1102 for training a machine-trained tagging model (e.g., the tagging model 104) that applies labels to queries. In block 1104, the multi-stage training system 102 receives a pre-trained language model (e.g., the pre-trained language model 112). In block 1106, the multi-stage training system 102 trains a pre-trained language model to interpret missing parts of a first set of queries in a first training set, to produce a first-stage model (e.g., the first-stage model 118). In block 1108, the multi-stage training system 102 trains a second-stage model (e.g., the second-stage model 126) by performing additional training on the first-stage model based on a second training set, a second-set training example in the second training set including a second-set supplemented query that is formed by combining an original second-set query with additional content, and second-set ground-truth label information. In block 1110, the multi-stage training system 102 trains a third-stage model (e.g., the third-stage model 130) by performing additional training on the second-stage model based on a third training set, a third-set training example in the third training set including a third-set query and third-set ground-truth label information. For example, in one implementation, the third-set query is a third-set supplemented query. The training of the third-stage model is based on: first loss information that represents accuracy of the third-stage model as measured against the third-set ground-truth label information, and second loss information produced by perturbing input data fed to the third-stage model. That is, the second loss information measures a difference between the model-generated label information produced based on original input data and a modified version of the model-generated label information that is produced by perturbing the input data a small amount. The perturbation has an effect of increasing a level of difficulty associated with a task of interpreting the input data. The third-stage model represents the machine-trained tagging model.

FIG. 12 shows another process 1202 for training a machine-trained language model (e.g., the tagging model 104). In block 1204, the multi-stage training system 102 receives an original query. In block 1206, the multi-stage training system 102 combines the original query with additional content, to produce a supplemented query. In block 1208, the multi-stage training system 102 receives ground-truth label information. In block 1210, the multi-stage training system 10 trains the machine-trained tagging model based on a training set that includes, as one training example, the supplemented query and the ground-truth label information.

FIG. 13 shows another process 1302 for training a machine-trained tagging model (e.g., the tagging model 104). In block 1304, the multi-stage training system 102 generates a prompt that describes a labeling task and a supplemented query. In block 1306, the multi-stage training system 102 submits the prompt to a language model (e.g., the language model 318). In block 1308, the multi-stage training system 102 receives a response from the language model to the prompt that provides ground-truth label information. In block 1310, the multi-stage training system 102 trains the machine-trained tagging model based on a training set that includes, as one training example, the supplemented query and the ground-truth label information.

FIG. 14 shows a computing system 1402 that, in some implementations, is used to implement any aspect of the mechanisms set forth in the above-described figures. For instance, in some implementations, the type of computing system 1402 shown in FIG. 14 is used to implement any local computing device or any server shown in FIG. 9. In all cases, the computing system 1402 represents a physical and tangible processing mechanism.

The computing system 1402 includes a processing system 1404 including one or more processors. The processor(s) include one or more central processing units (CPUs), and/or one or more graphics processing units (GPUs), and/or one or more application specific integrated circuits (ASICs), and/or one or more neural processing units (NPUs), and/or one or more tensor processing units (TPUs), etc. More generally, any processor corresponds to a general-purpose processing unit or an application-specific processor unit.

The computing system 1402 also includes computer-readable storage media 1406, corresponding to one or more computer-readable media hardware units. The computer-readable storage media 1406 retains any kind of information 1408, such as machine-readable instructions, settings, model weights, and/or other data. In some implementations, the computer-readable storage media 1406 includes one or more solid-state devices, one or more hard disks, one or more optical disks, etc. Any instance of the computer-readable storage media 1406 uses any technology for storing and retrieving information. Further, any instance of the computer-readable storage media 1406 represents a fixed or removable unit of the computing system 1402. Further, any instance of the computer-readable storage media 1406 provides volatile and/or non-volatile retention of information. The specific term "computer-readable storage medium" or "storage device" expressly excludes propagated signals per se in transit; a computer-readable storage medium or storage device is "non-transitory" in this regard.

The computing system 1402 utilizes any instance of the computer-readable storage media 1406 in different ways. For example, in some implementations, any instance of the computer-readable storage media 1406 represents a hardware memory unit (such as random access memory (RAM)) for storing information during execution of a program by the computing system 1402, and/or a hardware storage unit (such as a hard disk) for retaining/archiving information on a more permanent basis. In the latter case, the computing system 1402 also includes one or more drive mechanisms 1410 (such as a hard drive mechanism) for storing and retrieving information from an instance of the computer-readable storage media 1406.

In some implementations, the computing system 1402 performs any of the functions described above when the processing system 1404 executes computer-readable instructions stored in any instance of the computer-readable storage media 1406. For instance, in some implementations, the computing system 1402 carries out computer-readable instructions to perform each block of the processes described with reference to FIGS. 11-13. FIG. 14 generally indicates that hardware logic circuitry 1412 includes any combination of the processing system 1404 and the computer-readable storage media 1406.

In addition, or alternatively, the processing system 1404 includes one or more other configurable logic units that perform operations using a collection of logic gates. For instance, in some implementations, the processing system 1404 includes a fixed configuration of hardware logic gates, e.g., that are created and set at the time of manufacture, and thereafter unalterable. In addition, or alternatively, the processing system 1404 includes a collection of programmable hardware logic gates that are set to perform different application-specific tasks. The latter category of devices includes programmable array logic devices (PALs), generic array logic devices (GALs), complex programmable logic devices (CPLDs), field-programmable gate arrays (FPGAs), etc. In these implementations, the processing system 1404 effectively incorporates a storage device that stores computer-readable instructions, insofar as the configurable logic units are configured to execute the instructions and therefore embody or store these instructions.

In some cases (e.g., in the case in which the computing system 1402 represents a user computing device), the computing system 1402 also includes an input/output interface 1414 for receiving various inputs (via input devices 1416), and for providing various outputs (via output devices 1418). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1420 and an associated graphical user interface presentation (GUI) 1422. The display device 1420 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1402 also includes one or more network interfaces 1424 for exchanging data with other devices via one or more communication conduits 1426. One or more communication buses 1428 communicatively couple the above-described units together.

The communication conduit(s) 1426 is implemented in any manner, e.g., by a local area computer network, a wide area computer network (e.g., the Internet), point-to-point connections, or any combination thereof. The communication conduit(s) 1426 include any combination of hardwired links, wireless links, routers, gateway functionality, name servers, etc., governed by any protocol or combination of protocols.

FIG. 14 shows the computing system 1402 as being composed of a discrete collection of separate units. In some cases, the collection of units corresponds to discrete hardware units provided in a computing device chassis having any form factor. FIG. 14 shows illustrative form factors in its bottom portion. In other cases, the computing system 1402 includes a hardware logic unit that integrates the functions of two or more of the units shown in FIG. 14. For instance, in some implementations, the computing system 1402 includes a system on a chip (SoC or SOC), corresponding to an integrated circuit that combines the functions of two or more of the units shown in FIG. 14.

The following summary provides a set of illustrative examples of the technology set forth herein.

(A1) According to one aspect, a method (e.g., the process 1102) is described for training a machine-trained tagging model (e.g., the tagging model 124) that applies labels to queries. In block 1104, the multi-stage training system 102 receives a pre-trained language model (e.g., the pre-trained language model 112). In block 1106, the multi-stage training system 102 trains the pre-trained language model to interpret missing parts of a first set of queries in a first training set, to produce a first-stage model (e.g., the first-stage model 118). In block 1108, the multi-stage training system 102 trains a second-stage model (e.g., the second-stage model 126) by performing additional training on the first-stage model based on a second training set, a second-set training example in the second training set including a second-set supplemented query that is formed by combining an original second-set query with additional content, and second-set ground-truth label information. In block 1110, the multi-stage training system 102 trains a third-stage model (e.g., the third-stage model 130) by performing additional training on the second-stage model based on a third training set, a third-set training example in the third training set including a third-set query and third-set ground-truth label information. The training of the third-stage model is based on: first loss information that represents accuracy of the third-stage model as measured against the third-set ground-truth label information, and second loss information produced by perturbing input data fed to the third-stage model to increase a level of difficulty associated with a task of interpreting the input data. The third-stage model represents the machine-trained tagging model.

(B1) According to one illustrative aspect, another method (e.g., the process 1202) is described for training a machine-trained tagging model (e.g., the tagging model 124) that applies labels to queries. In block 1204, the multi-stage training system 102 receives an original query. In block 1206, the multi-stage training system 102 combines the original query with additional content, to produce a supplemented query. In block 1208, the multi-stage training system 102 receives ground-truth label information. In block 1210, the multi-stage training system 102 trains a machine-trained tagging model based on a training set that includes, as one training example, the supplemented query and the ground-truth label information. The training of the machine-trained tagging model is based on: first loss information that represents accuracy of the machine-trained tagging model as measured against the ground-truth label information, and second loss information produced by perturbing input data fed to the machine-trained tagging model to increase a level of difficulty associated with a task of interpreting the input data.

(C1) According to one illustrative aspect, another method (e.g., the processes 1202 and 1302) is described for training a machine-trained tagging model (e.g., the tagging model 124) that applies labels to queries. In block 1204, the multi-stage training system 102 receives an original query. In a version of block 1206, the multi-stage training system 102 identifies one or more titles of target items that match the original query, and combines the original query with the one or more titles, to produce a supplemented query. In block 1304, the multi-stage training system 102 generates a prompt that describes a labeling task and the supplemented query. In block 1306, the multi-stage training system 102 submits the prompt to a language model (e.g., the language model 318). In block 1308, the multi-sage training system 102 receives a response from the language model to the prompt that provides ground-truth label information. In block 1310, the multi-stage training system 102 trains the machine-trained tagging model based on a training set that includes, as one training example, the supplemented query and the ground-truth label information.

In yet another aspect, some implementations of the technology described herein include a computing system (e.g., the computing system 1402) that includes a processing system (e.g., the processing system 1404) having a processor. The computing system also includes a storage device (e.g., the computer-readable storage media 1406) for storing computer-readable instructions (e.g., the information 1408). The processing system executes the computer-readable instructions to perform any of the methods described herein (e.g., any individual method of the methods of A1, B1, and C1).

In yet another aspect, some implementations of the technology described herein include a computer-readable storage medium (e.g., the computer-readable storage media 1406) for storing computer-readable instructions (e.g., the information 1408). A processing system (e.g., the processing system 1404) executes the computer-readable instructions to perform any of the operations described herein (e.g., the operations in any individual method of the methods of A1, B1, and C1.

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the phrase "configured to" encompasses various physical and tangible mechanisms for performing an identified operation. The mechanisms are configurable to perform an operation using the hardware logic circuitry 1412 of FIG. 14. The term "logic" likewise encompasses various physical and tangible mechanisms for performing a task. For instance, each processing-related operation illustrated in the flowcharts of FIGS. 11-13 corresponds to a logic component for performing that operation.

Further, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. The term "prescribed" is used to designate that something is purposely chosen according to any environment-specific considerations. For instance, a threshold value or state is said to be prescribed insofar as it is purposely chosen to achieve a desired result. "Environment-specific" means that a state is chosen for use in a particular environment. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for training a machine-trained tagging model that applies labels to queries, comprising:

receiving a pre-trained language model;

training the pre-trained language model to interpret missing parts of a first set of queries in a first training set, to produce a first-stage model;

training a second-stage model by performing additional training on the first-stage model based on a second training set, a second-set training example in the second training set including a second-set supplemented query that is formed by combining an original second-set query with additional content, and second-set ground-truth label information, wherein the second-set supplemented query is formed by: extracting one or more parts of one or more target items, the one or more target items being determined by a search system to match the original second-set query; and appending the one or more parts to the original second-set query, and wherein the training of the second-stage model includes mapping a sequence of tokens in the second-set supplemented query to a sequence of model-generated labels; and training a third-stage model by performing additional training on the second-stage model based on a third training set, a third-set training example in the third training set including a third-set query and third-set ground-truth label information, the training of the third-stage model being based on: first loss information that represents accuracy of the third-stage model as measured against the third-set ground-truth label information, and second loss information produced by perturbing input data fed to the third-stage model to increase a level of difficulty associated with a task of interpreting the input data, the third-stage model representing the machine-trained tagging model.

2. The method of claim 1, wherein the one or more target items are one or more documents that the search system has identified as matching the original second-set query, and the wherein the one or more parts are one or more titles of the one or more documents.

3. The method of claim 1, wherein the second-set ground-truth label information is less reliable than the third-set ground-truth information.

4. The method of claim 1, wherein the second-set ground-truth label information is produced by:

generating a prompt that describes a labeling task and which describes the second-set supplemented query;

submitting the prompt to a language model; and receiving a response from the language model to the prompt that provides the second-set ground-truth label information.

5. The method of claim 4, wherein the prompt expresses the labeling task using a chain-of-reasoning format.

6. The method of claim 1, wherein the third-set query is a third-set supplemented query that is formed by supplementing an original third-set query with additional content by performing the extracting and the appending, and wherein the training of the third-stage model includes mapping a sequence of tokens in the original third-set query of the third-set supplemented query to another sequence of model-generated labels.

7. The method of claim 1, further comprising generating the first loss information for the third-set training example by:
  producing model-generated label information based on the third-set query; and
  determining a difference between the model-generated label information and the third-set ground-truth label information.

8. The method of claim 1, further comprising generating the second loss information for the third-set training example by:
  producing original model-generated label information for the third-set query;
  determining a perturbation of the input data that produces modified model-generated label information; and
  determining a difference between the original model-generated label information and the modified model-generated label information.

9. The method of claim 8, wherein the determining a perturbation is iteratively performed to successively increase the difference between the original model-generated label information and the modified model-generated label information.

10. The method of claim 8, wherein the determining a perturbation is performed to maximize the difference between the original model-generated label information and the modified model-generated label information.

11. The method of claim 1, wherein the training a third-stage model comprises generating the second loss information prior to generating the first loss information.

12. The method of claim 1, wherein the mapping does not produce labels for terms in the one or more parts of the second-set supplemented query.

13. A computer-readable storage medium for storing computer-readable instructions, a processing system executing the computer-readable instructions to perform operations, the operations comprising each of:
  receiving an original query;
  extracting one or more parts of target items, the one or more target items being determined by a search system to match the original query;
  appending the one or more parts to the original query, to produce a supplemented query, and
  receiving ground-truth label information; and
  training a machine-trained tagging model based on a training set that includes, as one training example, the supplemented query and the ground-truth label information,
  wherein the training of the machine-trained tagging model includes mapping a sequence of tokens in the supplemented query to a sequence of model-generated labels, and
  the training of the machine-trained tagging model being based on: first loss information that represents accuracy of the machine-trained tagging model as measured against the ground-truth label information, and second loss information produced by perturbing input data fed to the machine-trained tagging model to increase a level of difficulty associated with a task of interpreting the input data.

14. The computer-readable storage medium of claim 13, wherein the machine-trained tagging model is trained in plural stages of a multi-stage training process, and wherein the use of the second loss information occurs in a particular stage of the multi-stage training process, and not in at least one other preceding stage of the multi-stage training process.

15. The computer-readable storage medium of claim 13, wherein the one or more target items are one or more documents that the search system has identified as matching the original query, and the wherein the one or more parts are one or more titles of the one or more documents.

16. The computer-readable storage medium of claim 13, further comprising generating the first loss information by:
  producing model-generated label information based on the supplemented query; and
  determining a difference between the model-generated label information and the ground-truth label information.

17. The computer-readable storage medium of claim 13, further comprising generating the second loss information by:
  producing original model-generated label information for the supplemented query;
  determining a perturbation of the input data that produces modified model-generated label information; and
  determining a difference between the original model-generated label information and the modified model-generated label information.

18. The computing system of claim 13, wherein the mapping does not produce labels for terms in the one or more parts of the supplemented query.

19. A computing system for training a machine-trained tagging model that applies labels to queries, comprising:
  an instruction data store for storing computer-readable instructions; and
  a processing system for executing the computer-readable instructions in the data store, to perform operations including:
  receiving an original query;
  extracting one or more titles of target items, the one or more target items being determined by a search system to match the original query; and
  appending the one or more titles to the original query, to produce a supplemented query;
  training the machine-trained tagging model based on a training set that includes, as one training example, the supplemented query and ground-truth label information,
  wherein the training of the machine-trained tagging model includes mapping a sequence of tokens in original query of the supplemented query to a sequence of model-generated labels, and
  wherein the mapping does not produce labels for terms in the one or more titles of the supplemented query.

20. The computing system of claim 19, wherein the machine-trained tagging model is trained in plural stages of a multi-stage training process.

* * * * *